(12) United States Patent
Tamura et al.

(10) Patent No.: US 7,447,486 B2
(45) Date of Patent: Nov. 4, 2008

(54) DATA TRANSMISSION/RECEPTION SYSTEM, MOBILE TERMINAL, CONTENT SERVER, RADIO BASE STATION DEVICE AND METHOD FOR DATA TRANSMISSION/RECEPTION

(75) Inventors: Ryo Tamura, Tokyo (JP); Takeshi Fukuizumi, Tokyo (JP)

(73) Assignee: NEC Corporation (JP)

( * ) Notice: Subject to any disclaimer, the term of this patent is extended or adjusted under 35 U.S.C. 154(b) by 397 days.

(21) Appl. No.: 10/395,626

(22) Filed: Mar. 25, 2003

(65) Prior Publication Data

US 2003/0186704 A1 Oct. 2, 2003

(30) Foreign Application Priority Data

Mar. 26, 2002 (JP) ............................. 2002-087197

(51) Int. Cl.
*H04B 1/18* (2006.01)
(52) U.S. Cl. ..................... 455/154.1; 725/87
(58) Field of Classification Search ................ 455/574, 455/343, 130, 182.3, 38.1, 426, 412, 3.06, 455/422.1, 450, 154.1, 3.01, 3.05, 414, 1; 348/461, 468; 379/126, 408; 725/87, 100, 725/101, 91, 97, 103, 104
See application file for complete search history.

(56) References Cited

U.S. PATENT DOCUMENTS

| 5,625,880 | A  | * | 4/1997  | Goldburg et al. ........... 340/7.22 |
| 6,462,646 | B2 | * | 10/2002 | Helferich ................... 340/7.21 |
| 6,711,246 | B1 | * | 3/2004  | Albal et al. ................. 379/126 |
| 6,735,634 | B1 | * | 5/2004  | Geagan et al. .............. 709/235 |
| 2002/0019743 | A1 | * | 2/2002 | Nakamura .................... 705/1 |
| 2002/0032018 | A1 | * | 3/2002 | Morton et al. .............. 455/412 |
| 2003/0005454 | A1 | * | 1/2003 | Rodriguez et al. ............ 725/89 |
| 2003/0025832 | A1 | * | 2/2003 | Swart et al. ................. 348/461 |
| 2003/0027608 | A1 | * | 2/2003 | Carmeli et al. .............. 455/574 |
| 2003/0153288 | A1 | * | 8/2003 | Nakatsuyama ............... 455/130 |
| 2004/0171378 | A1 | * | 9/2004 | Rautila ........................ 455/419 |

FOREIGN PATENT DOCUMENTS

| JP | 10-200493 | 7/1998 |
| JP | 10-512074 | 11/1998 |
| JP | 11-331070 | 11/1999 |
| JP | 2001-69558 | 3/2001 |

(Continued)

*Primary Examiner*—Edward Urban
*Assistant Examiner*—Tu X Nguyen
(74) *Attorney, Agent, or Firm*—Dickstein, Shapiro, LLP.

(57) ABSTRACT

A data transmission/reception system for offering content download service through a wireless communication network, in which users can obtain desired content on demand from the beginning of content data, and the shortage of line capacity can be alleviated, thus enabling a reduction of communication charges. A mobile terminal is provided with two types of downloading means, an immediate download processing means and a reservation download processing means. The reservation download processing means makes a download reservation by storing the meta-data of desired content. When transmitting content to one mobile terminal that has made a request for an immediate download of the content, a radio base station allocates a prescribed channel for the mobile terminal and sends notification including information on the allocated channel to other mobile terminals in the radio communication zone of the radio base station. Having received the notification, each mobile terminal tunes in to the channel, and selectively download reserved content.

102 Claims, 17 Drawing Sheets

FOREIGN PATENT DOCUMENTS

| | | |
|---|---|---|
| JP | 2001-197021 | 7/2001 |
| JP | 2001-344217 | 12/2001 |
| JP | 2002-26836 | 1/2002 |
| JP | 2002-77130 | 3/2002 |
| JP | 2002-77856 | 3/2002 |

* cited by examiner

F I G. 13
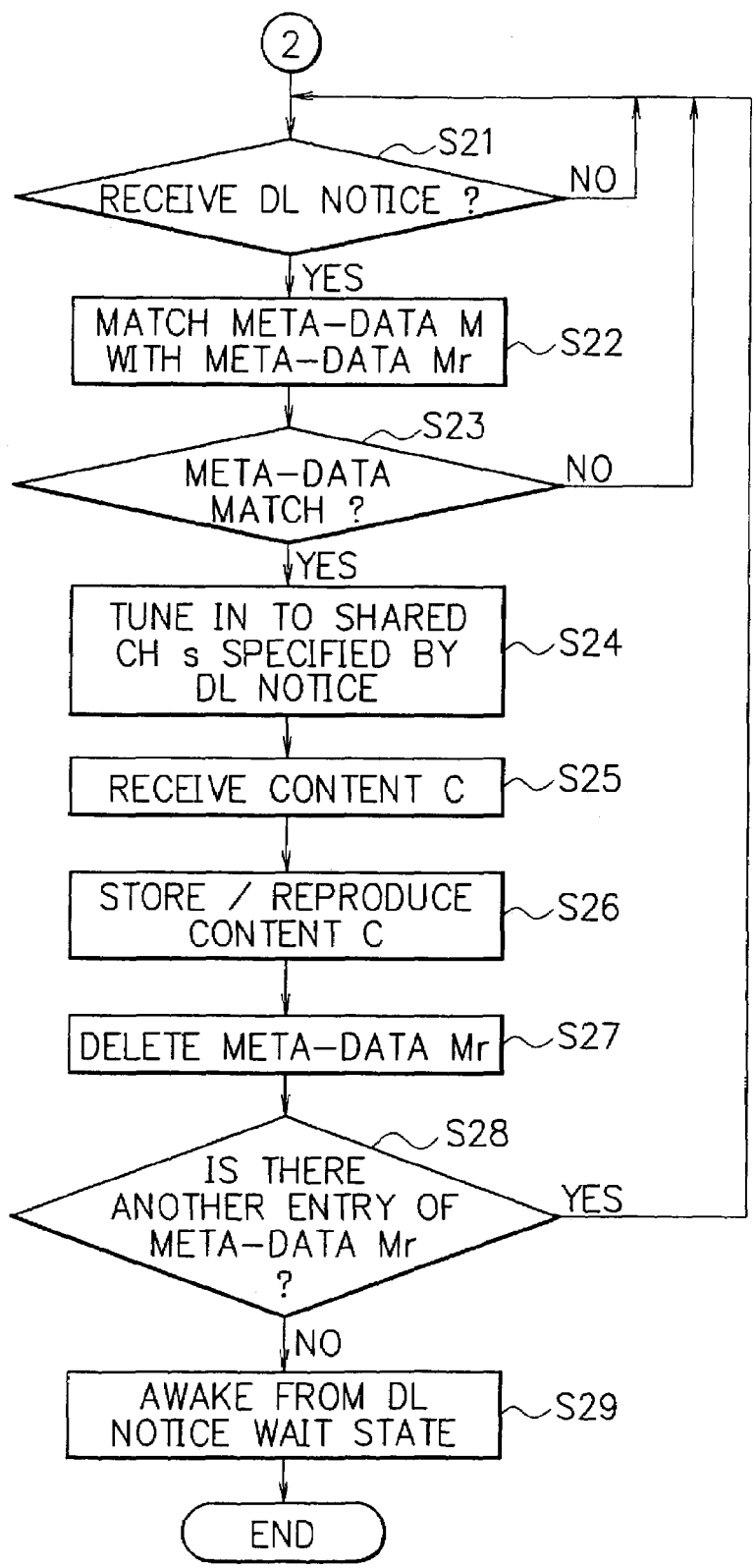

F I G. 16
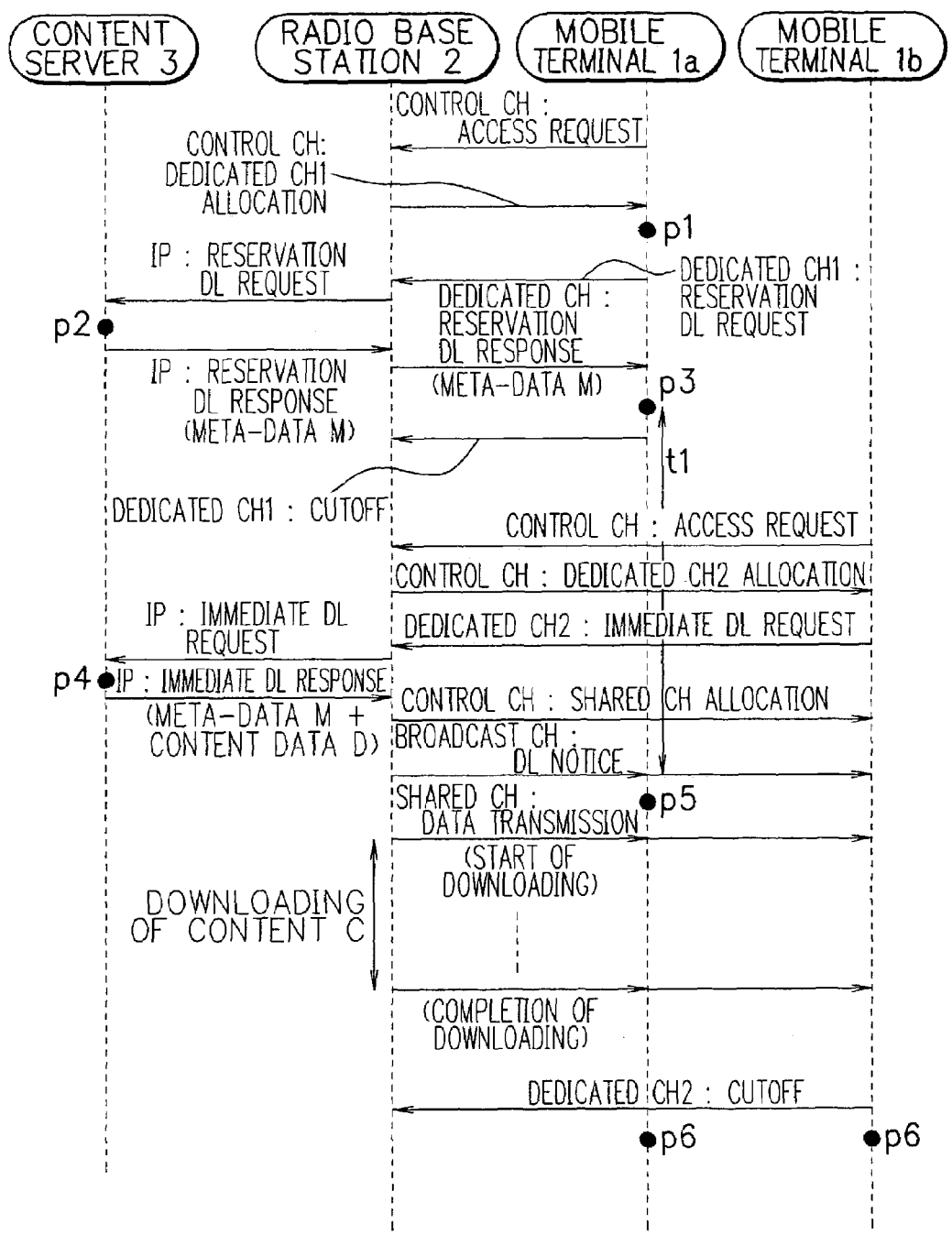

F I G. 17
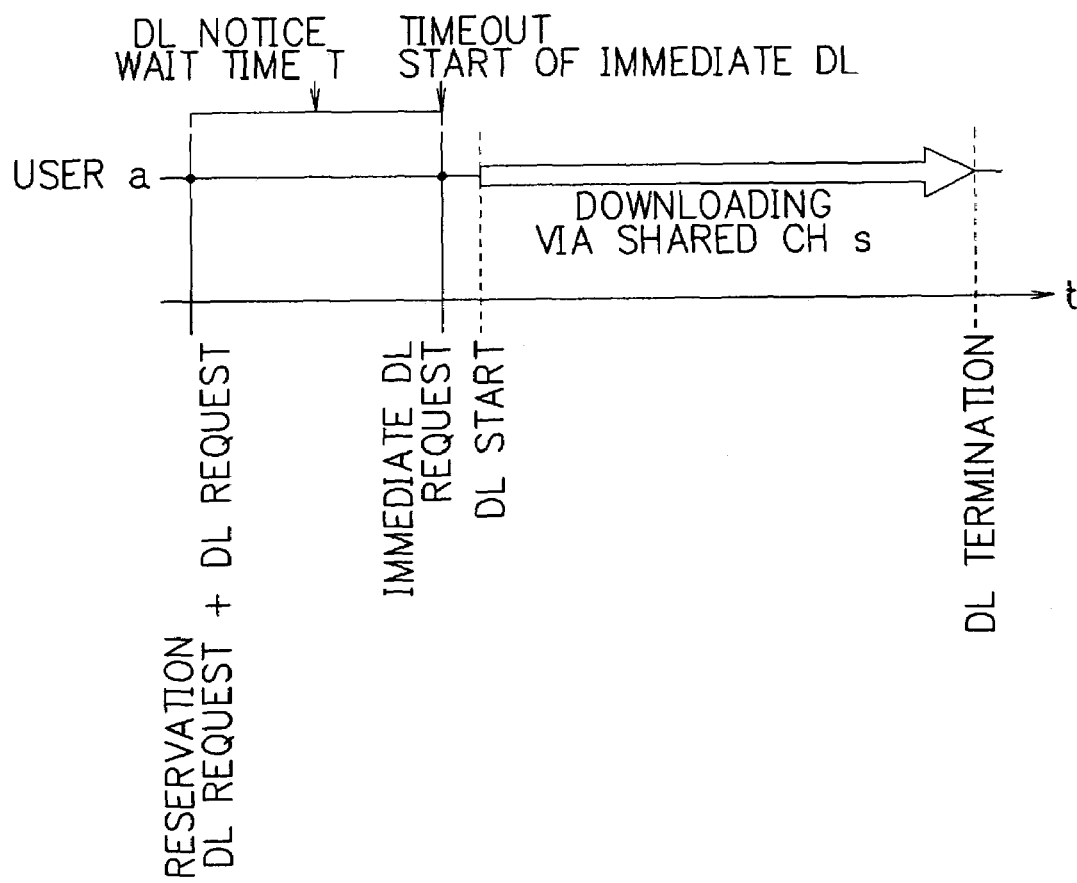

DATA TRANSMISSION/RECEPTION SYSTEM, MOBILE TERMINAL, CONTENT SERVER, RADIO BASE STATION DEVICE AND METHOD FOR DATA TRANSMISSION/RECEPTION

FIELD OF THE INVENTION

The present invention relates to a data transmission/reception system to use a wireless communication network such as a cellular phone system and, more particularly, to a system for transmitting/receiving content including a large amount of data such as moving images and music.

BACKGROUND OF THE INVENTION

Techniques for transmitting/receiving data via a cellular phone have been developed in recent years so that users can enjoy rich contents (contents having a large amount of data) such as moving images and music on their cellular phones. However, radio base stations do not have enough line or channel capacity for delivering such rich contents to users' cellular phones, and telecommunications carriers cannot offer the service at low price. Besides, users still hesitate to download the rich contents since radio communication is generally charged at a metered rate (accounting is given depending on the amount of downloaded data).

As a technique for dealing with the above problems, there has been disclosed a method for delivering data to mobile terminals through broadcasting type service channels in Japanese Patent Application laid open No. 2002-26836. FIG. 1 is a diagram showing the image of a download method (broadcasting type service) according to the prior art. In the prior art, content (broadcast program) is delivered to a plurality of users via prescribed channels at the fixed hour. That is, the users cannot receive and obtain desired contents at desired time or on demand.

Incidentally, the broadcasting type service is a type of service in which data (program, contents) are unilaterally sent to users at the proscribed hour.

As another technique for dealing with the above problems, there has been disclosed a method of simultaneous data delivery to plural user terminals by sharing the same downlink channel in radio links (a transmission channel from a radio base station to the mobile terminals of users) in Japanese Patent Application laid open No. 2001-69558. According to the technique, when a user requests a download of content within a certain period of waiting time (for example, five seconds) after another user has made a request for the same content, the content is delivered simultaneously to the users via the same downlink channel. In addition, when a user (second user) requests a download of content while another user (first user) is downloading the content, the same downlink channel being used for downloading the content to the first user is also allocated for the second user, and the second user receives the content from the middle of content data. FIG. 2 is a diagram showing the image of downloading (in which the same channel is shared by two users from the middle of downloading) according to the prior art.

With this technique, however, in the case where plural user terminals share the same downlink channel to download content from the beginning of content data, such channel shared downloading cannot be performed unless a request for the same content is made within a certain period of waiting time. In the description of the above prior art, the waiting time is assumed to be five seconds as an example. When the waiting time is short, the probability of the same requests occurring in the waiting time is decreased. On the other hand, long waiting time delays the time which it takes to complete downloading after a user made a request, and the practicability of service is reduced. Besides, in the case where a user (second user) requests a download of content while another user (first user) is downloading the same content, the same downlink channel being used for downloading the content to the first user is also allocated for the second user, and the second user receives the content from the middle of content data via the downlink shared channel as described above. Consequently, user(s) other than the first user cannot obtain the entire data of the desired content.

SUMMARY OF THE INVENTION

It is therefore an object of the present invention to provide a data transmission/reception system for offering download service with respect to rich contents such as moving images and music to mobile terminals through the wireless communication network of the cellular phone system and the like, wherein users can receive and obtain desired contents at desired time or on demand unlike with the broadcasting type content distribution service, and the content is downloaded from the beginning of content data. With the data transmission/reception system, the shortage of line capacity for delivering the rich contents can be alleviated, and communication charge is reduced.

It is another object of the present invention to provide a data transmission/reception system for meeting the needs of both users who wish to obtain content immediately and users who choose inexpensive communication charge rater than immediate downloading.

In accordance with the first aspect of the present invention, to achieve the above object, there is provided a data transmission/reception system, comprising: a radio base station; a plurality of mobile terminals; and a content server for managing contents; wherein: the radio base station includes a means for assigning a prescribed channel to the first mobile terminal when transmitting content to the first mobile terminal via a radio link, and notifying the second mobile terminal in the radio communication zone of the radio base station about the channel; and the second mobile terminal includes a means for downloading the content using the channel in common with the first mobile terminal when notified of the channel.

In accordance with the second aspect of the present invention, in the first aspect, the second mobile terminal includes a reservation means for reserving a download of content, and selectively downloads the content reserved by the reservation means via the radio link.

In accordance with the third aspect of the present invention, in the second aspect, the reservation means reserves a download of content by storing meta-data of the content in a reservation meta-data managing section as reserved meta-data; and the second mobile terminal downloads the content when the reserved meta-data matches meta-data of the content to be transmitted to the first mobile terminal from the radio base station.

In accordance with the fourth aspect of the present invention, in the third aspect, the second mobile terminal internally includes the reservation meta-data managing section; the radio base station notifies the second mobile terminal about the meta-data of the content to be transmitted to the first mobile terminal in addition to about the channel; and the second mobile terminal matches the notified meta-data with the reserved meta-data, and downloads the content when the two meta-data match.

In accordance with the fifth aspect of the present invention, there is provided a data transmission/reception system, comprising: a radio base station; a plurality of mobile terminals; and a content server for managing contents; wherein: each of the mobile terminals include an immediate download processing means for immediately downloading desired content from the content server, and a reservation download processing means for reserving a download of content to download the content afterwards; the reservation download processing means reserves a download of desired content by obtaining and storing meta-data of the content; the radio base station assigns a downlink shared channel to the mobile terminal which immediately downloads content by the immediate download processing means when transmitting the content thereto, and simultaneously notifies all the mobile terminals in the radio communication zone of the radio base station about information on the downlink shared channel and meta-data of the outgoing content; and the mobile terminals that have been notified of the information match the notified meta-data with the meta-data stored by the reservation download processing means, and tune in to the downlink shared channel to download the content when the outgoing content proves coincident with the reserved content.

In accordance with the sixth aspect of the present invention, there is provided a data transmission/reception system, comprising: a radio base station; a plurality of mobile terminals; and a content server for managing contents and meta-data thereof to offer download service to the mobile terminals; wherein: each of the mobile terminals include a data communication section provided with an immediate download processing means for immediately downloading desired content from the content server, and a reservation download processing means for reserving a download of desired content by obtaining and storing meta-data of the content to download the content afterwards; when receiving a request for an immediate download from one of the mobile terminals, the content server sends content data and meta-data of the requested content to the mobile terminal in response; when receiving a request for a reservation download of content from one of the mobile terminals, the content server sends meta-data of the requested content to the mobile terminal in response; the radio base station assigns a downlink shared channel to the mobile terminal when transmitting the content data and meta-data of the requested content sent from the content server by the immediate download request, and simultaneously notifies all the mobile terminals in the radio communication zone of the radio base station about information on the downlink shared channel and meta-data of the outgoing content; and the mobile terminals that have been notified of the information match the notified meta-data with the meta-data stored by the reservation download processing means, and tune in to the downlink shared channel to download the content when the outgoing content proves coincident with the reserved content.

In accordance with the seventh aspect of the present invention, in the fifth or sixth aspect, the mobile terminal further includes a means for operating in standby for a certain period of waiting time after reserving a download of content and, when receiving no notification from the radio base station within the waiting time, making a request to the content server for an immediate download of the content to download the reserved content.

In accordance with the eighth aspect of the present invention, in the seventh aspect, the mobile terminal further includes a means by which a user sets the waiting time, and operates in standby based on the waiting time set by the user.

In accordance with the ninth aspect of the present invention, in one of the fifth to eighth aspects, the mobile terminal further includes a means for making a request to the radio base station for missing data packets through a prescribed channel to obtain the entire data of the reserved content when the mobile terminal has not received the entire data of the reserved content by downloading.

In accordance with the tenth aspect of the present invention, in one of the fifth to ninth aspects, the data transmission/reception system further comprises: an accounting server; and a determining means for determining a download type adopted by the respective mobile terminals; wherein the accounting server maintains communication records with regard to downloads made by the mobile terminals, and conducts accounting for the mobile terminals according to the download type determined by the determining means.

In accordance with the eleventh aspect of the present invention, in the tenth aspect, the mobile terminal sends a reception completion message to the radio base station on completion of downloading; the radio base station determines a download type adopted by the mobile terminal based on the reception completion message, and sends information including the determined download type, the reception completion message and the amount of communicated data to the accounting server; and the accounting server stores the information sent from the radio base station as the communication records to conduct accounting according to the communication records.

In accordance with the twelfth aspect of the present invention, in one of the fifth to eleventh aspects, the mobile terminal further includes a category reservation means for specifying a certain category to reserve downloads of contents by category, and selectively downloads the contents which belong to the specified category via the radio link.

In accordance with the thirteenth aspect of the present invention, in the twelfth aspect, the meta-data of content includes a variety of attribute values as information elements; the category reservation means specifies the attribute value and stores it to reserve downloads of contents by category; and the mobile terminal that has received notification from the radio base station matches the meta-data in the notification with the stored attribute value to download the content via the downlink shared channel when the two values match.

In accordance with the fourteenth aspect of the present invention, in one of the fifth to thirteenth aspects, the meta-data of content includes a description of copyright information indicating regulations and control specifications for the use of the content in the mobile terminals as an information element; and the mobile terminal regulates and controls the use of the content according to the copyright information after the completion of downloading.

In accordance with the fifteenth aspect of the present invention, there is provided a mobile terminal comprising: a radio communication section for having radio communication with a radio base station via a radio link; and a means for reserving a download of content that is sent from the radio base station via a radio downlink; wherein, when receiving notification including information on a channel in the radio link for transmitting content from the base station, the mobile terminal selectively downloads the reserved content through the channel.

In accordance with the sixteenth aspect of the present invention, there is provided a mobile terminal which is linked to a radio base station via a radio link and downloads content by communicating with a content server, comprising: a radio communication section for having radio communication with the radio base station via the radio link; a data communication section for communicating data with the content server through the radio communication section; and a content storage/reproduction section for storing/reproducing content downloaded from the content server; wherein: the data communication section is provided with an immediate download processing means for immediately downloading content, and a reservation download processing means for reserving a download of content to download the content afterwards; and when receiving notification including information on a downlink shared channel for transmitting content from the base station, the data communication section tunes in to the downlink shared channel and selectively downloads the reserved content.

In accordance with the seventeenth aspect of the present invention, in the sixteenth aspect, the reservation download processing means reserves a download of desired content by storing meta-data of the content in the mobile terminal; when receiving the notification including information on the meta-data of outgoing content in the radio link and the downlink shared channel for transmitting the content, the data communication section matches the meta-data in the notification with the meta-data stored by the reservation download processing means, and tunes in to the downlink shared channel to download the content when two meta-data match.

In accordance with the eighteenth aspect of the present invention, in the sixteenth or seventeenth aspect, the mobile terminal further comprises a means for operating in standby for a certain period of waiting time after reserving a download of content and, when receiving no notification from the radio base station within the waiting time, making a request to the content server for an immediate download of the content to download the reserved content.

In accordance with the nineteenth aspect of the present invention, in the eighteenth aspect, the mobile terminal further comprises a means by which a user sets the waiting time, and operates in standby based on the waiting time set by the user.

In accordance with the twentieth aspect of the present invention, in one of the fifteenth to nineteenth aspects, the mobile terminal further comprises a means for sending a request for missing data packets to the radio base station via a prescribed channel to obtain the entire data of the reserved content when the mobile terminal has not received the entire data of the reserved content through downloading performed by the reservation download processing means.

In accordance with the twenty-first aspect of the present invention, there is provided a mobile terminal which is linked to a radio base station via a radio link, provided with a means for specifying a certain category to reserve downloads of contents by category, and selectively downloads the contents which belong to the specified category via the radio link.

In accordance with the twenty-second aspect of the present invention, in one of the fifteenth to twentieth aspects, the meta-data of content includes a variety of attribute values as information elements; the mobile terminal further comprises a means for specifying the attribute value and stores it to reserve downloads of contents by category and, when receiving the notification from the radio base station, matches the meta-data in the notification with the stored attribute value to download the content via the downlink shared channel when the two values match.

In accordance with the twenty-third aspect of the present invention, in one of the fifteenth to twenty-second aspects, the meta-data of content includes a description of copyright information indicating regulations and control specifications for the use of the content; and the mobile terminal further comprises a means for regulating and controlling the use of the content according to the copyright information after the completion of downloading.

In accordance with the twenty-fourth aspect of the present invention, there is provided a content server comprising: a content managing means for managing content data and meta-data; and a data communication section for handling data communication with mobile terminals that are linked to a radio base station on a wireless communication network via radio links; wherein, when receiving a request for a reservation download of content from the mobile terminal, the content server sends meta-data of the requested content to the mobile terminal in response; and when receiving a request for an immediate download of content from the mobile terminal, the content server sends content data and meta-data of the requested content to the mobile terminal in response.

In accordance with the twenty-fifth aspect of the present invention, there is provided a radio base station connected with a wireless communication network, comprising: a radio communication section for handling radio communication with mobile terminals that are linked to the radio base station via radio links according to a prescribed multiple accessing method; a means for assigning a prescribed channel in the radio link to send content on beginning to receive content data and meta-data from a content server that is connected to the wireless communication network; and a means for notifying the mobile terminals in the radio communication zone of the radio base station about information on the channel; wherein, simultaneous downloading is performed by simultaneously sending the content to the mobile terminals in the radio communication zone via the assigned channel after sending the notification.

In accordance with the twenty-sixth aspect of the present invention, there is provided a radio base station connected with a wireless communication network, comprising: a radio communication section for handling radio communication with mobile terminals that are linked to the radio base station via radio links according to a prescribed multiple accessing method; a means for assigning a downlink shared channel to send content on beginning to receive content data and meta-data sent from a content server that is connected to the wireless communication network in response to a request to the content server for an immediate download; and a means for simultaneously sending notification including the downlink shared channel information and the meta-data of outgoing content to the mobile terminals in the radio communication zone of the radio base station via a broadcast channel; wherein, simultaneous downloading is performed by simultaneously sending the content to the mobile terminals in the radio communication zone via the downlink shared channel after sending the notification.

In accordance with the twenty-seventh aspect of the present invention, in the twenty-sixth aspect, the radio base station further comprises a means for, when receiving a request from the mobile terminal for missing data packets of content in the transmission of the content via the downlink shared channel, sending the missing data packets so that the mobile terminal can obtain the entire data of the content.

In accordance with the twenty-eighth aspect of the present invention, in the twenty-sixth or twenty-seventh aspect, the radio base station further comprises: a means for receiving a reception completion message indicating that the reception of the content data has been completed from the mobile terminal, and determining a download type adopted by the mobile terminal based on the reception completion message; and a means for sending information including the determined download type, the reception completion message and the amount of communicated data to an accounting server so that the accounting server can store the information.

In accordance with the twenty-ninth aspect of the present invention, there is provided a data transmission/reception method for downloading contents from a content server to a plurality of mobile terminals linked to a radio base station, comprising: a step in which the first mobile terminal reserves a download of desired content by obtaining and storing meta-data of the content and enters standby mode; a step in which the content server sends content data and meta-data of content to the second mobile terminal in response to a request from the second mobile terminal; a step in which the radio base station receives the content data and meta-data of the content from the content server, and assigns a downlink shared channel; a step in which the radio base station sends notification including information on the downlink shared channel and meta-data of the received content to all the mobile terminals in the radio communication zone of the radio base station; a step in which the first mobile terminal that have received the notification matches the meta-data in the notification with the meta-data stored on the occasion of reserving the download; a step in which the first mobile terminal tunes in to the informed downlink shared channel when the outgoing content proves coincident with the reserved content; a step in which the radio base station starts transmitting the content via the downlink shared channel; and a step in which the first and second mobile terminals receive the content via the downlink shared channel.

In accordance with the thirtieth aspect of the present invention, there is provided a data transmission/reception method for downloading contents from a content server to a plurality of mobile terminals linked to a radio base station, comprising: a step in which the first mobile terminal reserves a download by making a request to the content server for a reservation download of desired content to obtain and store meta-data of the content, and enters standby mode; a step in which the content server receives a request for an immediate download of content from the second mobile terminal, and sends content data and meta-data of the content to the second mobile terminal in response; a step in which the radio base station receives the content data and meta-data of the content sent from the content server in response to the immediate download request, and assigns a downlink shared channel for the second mobile terminal; a step in which the radio base station simultaneously sends notification including information on the downlink shared channel and meta-data of the received content to all the mobile terminals in the radio communication zone of the radio base station via a broadcast channel; a step in which the first mobile terminal that have received the notification matches the meta-data in the notification with the meta-data stored on the occasion of reserving the download; a step in which the first mobile terminal tunes in to the informed downlink shared channel when two meta-data match; a step in which the radio base station starts transmitting the content data and meta-data via the downlink shared channel; and a step in which the first and second mobile terminals receive the content data via the downlink shared channel.

In accordance with the thirty-first aspect of the present invention, in the twenty-ninth or thirtieth aspect, the first mobile terminal operates in standby for a certain period of waiting time after reserving the download of the content and, when receiving no notification from the radio base station within the waiting time, makes a request to the content server for an immediate download of the content to download the reserved content.

In accordance with the thirty-second aspect of the present invention, in one of the twenty-ninth to thirty-first aspects, the first mobile terminal sends a request for missing data packets to the radio base station through a prescribed channel to obtain the entire data of the content when the mobile terminal has not received the entire data of the content by downloading via the downlink shared channel.

In accordance with the thirty-third aspect of the present invention, in one of the twenty-ninth to thirty-second aspects, the data transmission/reception method further comprises: a step in which the first and second mobile terminals each send a reception completion message indicating that the reception of the content data has been completed to the radio base station; a step in which the radio base station determines a download type adopted by each mobile terminal based on the reception completion message; a step in which the radio base station sends information including the determined download type, the reception completion message and the amount of communicated data to an accounting server; a step in which the accounting server stores the information sent from the radio base station as the communication records; and a step in which the accounting server conducts accounting for mobile terminals according to the download type with reference to the communication records.

In accordance with the thirty-fourth aspect of the present invention, in one of the twenty-ninth to thirty-third aspects, the data transmission/reception method further comprises: a step in which the third mobile terminal specifies an attribute value in the meta-data and stores it to reserve downloads of contents by category; and a step in which, when receiving the notification from the radio base station, the third mobile terminal matches the meta-data in the notification with the stored attribute value, and downloads the content via the downlink shared channel when the two values match.

In accordance with the thirty-fifth aspect of the present invention, in one of the twenty-ninth to thirty-fourth aspects, the data transmission/reception method further comprises: a step in which the mobile terminal regulates and controls the use of the content based on a description of copyright information indicating regulations and control specifications for the use of the content included in the meta-data of the content after the completion of downloading.

BRIEF DESCRIPTION OF THE DRAWINGS

The objects and features of the present invention will become more apparent from the consideration of the following detailed description taken in conjunction with the accompanying drawings in which:

FIG. 13 is a flowchart showing a procedure following the procedure shown in FIG. 12, from download notice wait state until the completion of downloading, in the mobile terminal;

FIG. 16 is a sequence diagram showing a flow of concrete download process in the data transmission/reception system according to the first embodiment;

FIG. 17 is a diagram showing download notice wait operation of a prescribed period of time in a data transmission/reception system according to the second embodiment of the present invention;

DESCRIPTION OF THE PREFERRED EMBODIMENTS

Figure 1:
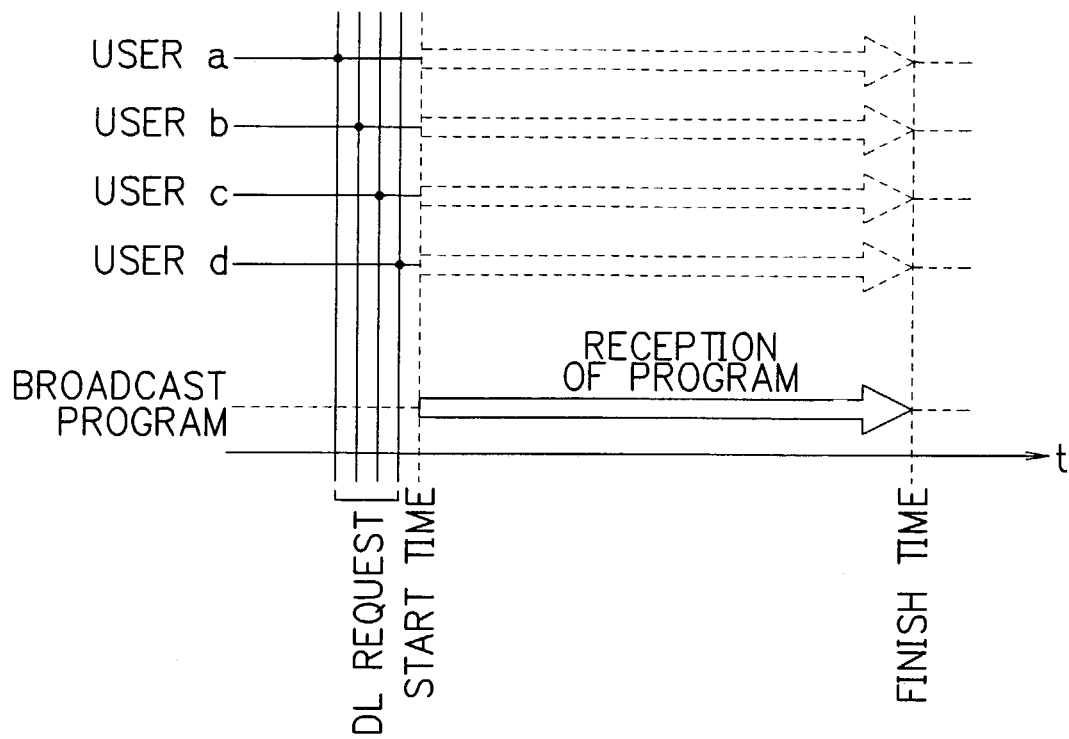
FIG. 1 is a diagram showing the image of a download method (broadcasting type service) according to a conventional technique.
Figure 2:
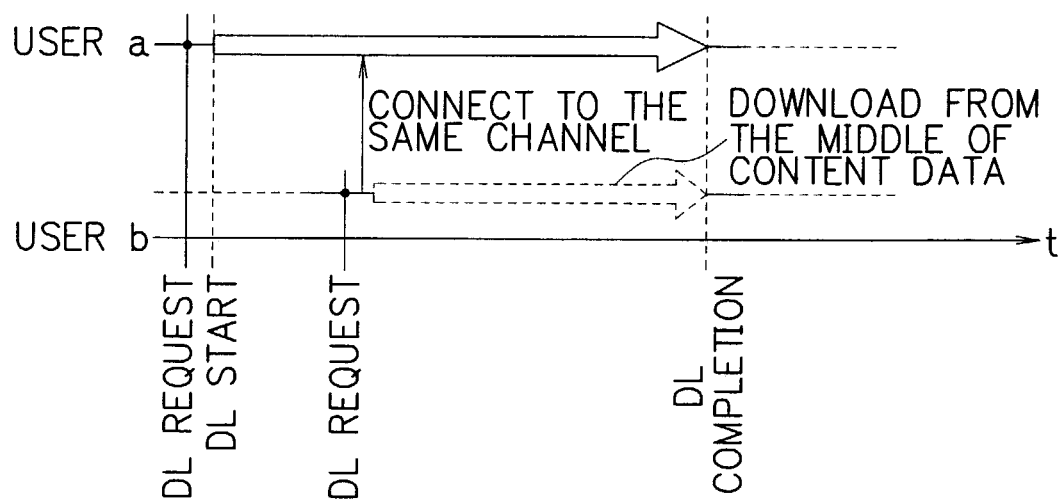
FIG. 2 is diagram showing the image of downloading (in which the same channel is shared by two users from the middle of downloading) according to another conventional technique.

Referring now to the drawings, a description of preferred embodiments of the present invention will be given in detail.

Figure 3:
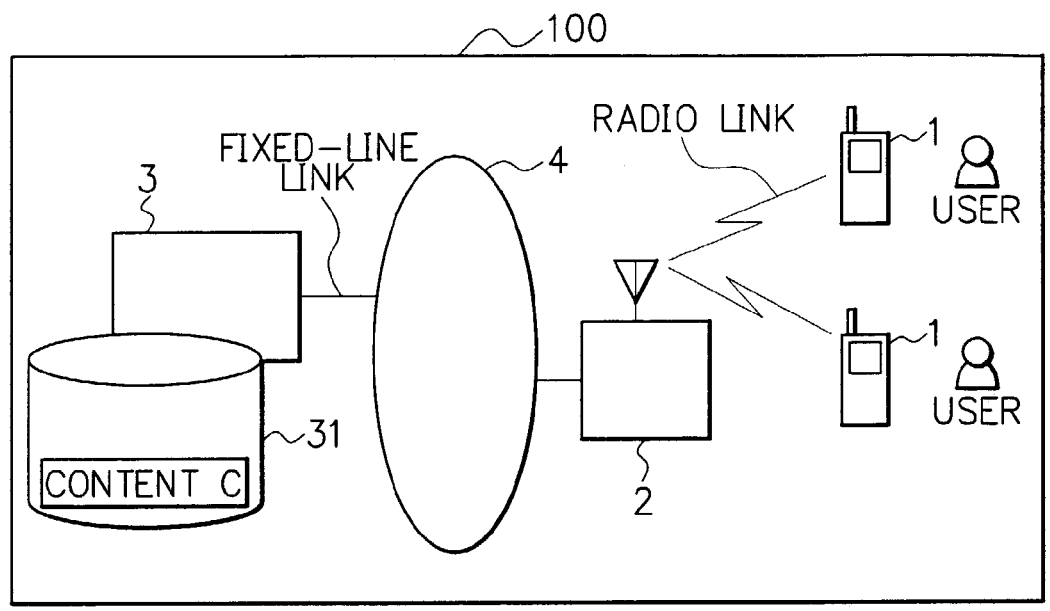
FIG. 3 is a diagram showing the entire configuration of a data transmission/reception system according to the first embodiment of the present invention.

FIG. 3 is a diagram showing the entire configuration of a data transmission/reception system 100 according to the first embodiment of the present invention. The data transmission/reception system 100 comprises a plurality of user mobile terminals 1, a radio base station 2, a content server 3 and a wireless communication network 4. The wireless communication network 4 is a service network offered by a prescribed radio communication carrier, and provides communication processing which is fundamental to data communication between the mobile terminals and content server. The mobile terminals 1 are linked to the radio base station 2 via radio links. The content server 3 includes a content managing means 31 for storing/managing contents such as moving images and music, and provides content download service through the wireless communication network 4 in response to requests from the mobile terminals 1. The content server 3 is typically set on an IP network. Incidentally, in this embodiment, the wireless communication network 4 is of a cellular phone system, and the mobile terminals are cellular phones as mobile stations.

Figure 4:
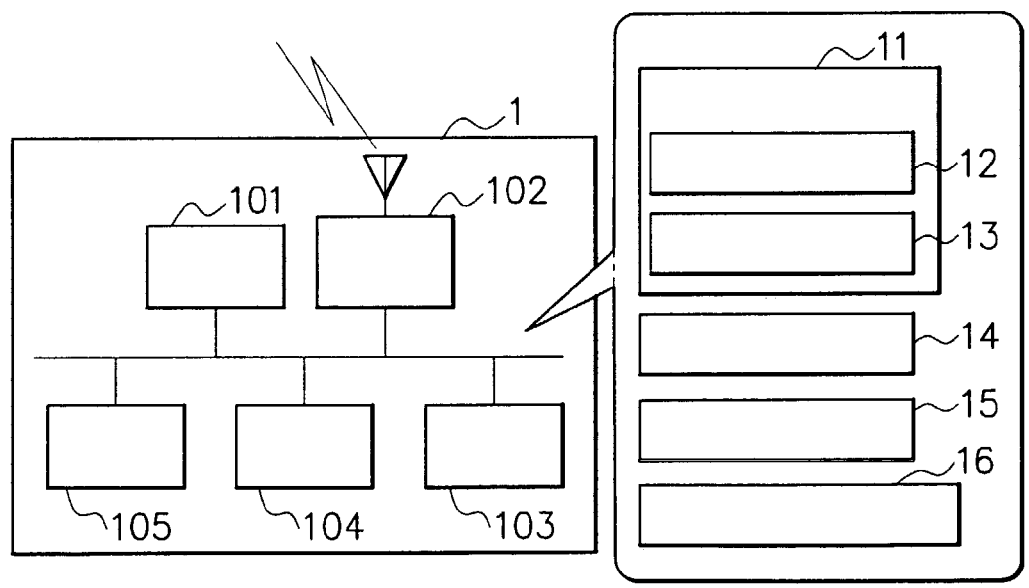
FIG. 4 is a block diagram showing the configuration of a mobile terminal depicted in FIG. 3.

FIG. 4 is a block diagram showing the configuration of the mobile terminal 1 of the first embodiment. The mobile terminal 1 is a mobile terminal unit carried around by a user such as a cellular phone. Examples of the mobile terminal 1 include PDA (Personal Digital Assistant) and PHS (Personal Handyphone System). As can be seen in FIG. 4, the mobile terminal 1 comprises a control section 101, a radio communication section 102, storage section 103, input section 104 and output section 105.

The control section 101 includes MPU (Micro Processing Unit), and controls the whole of the mobile terminal 1. Programs for implementing respective characteristic functions of the mobile terminal 1 are stored in the storage section 103 such as ROM (Read Only Memory), RAM (Random Access Memory), etc., or may be downloaded from a prescribed node as needed and stored in the storage section 103. The programs are sequentially executed by the control section 101 for implementing the aforementioned functions.

The radio communication section 102 is provided with an antenna unit, and handles radio transmission/reception including data communication with the content server 3 as well as voice call communication in a wireless section (radio link) between the mobile terminal 1 and radio base station 2. The radio communication section 102 carries out each processing in layers 1, 2 and 3 in wireless data communication network architecture. In the layer 1 (physical layer), the radio communication section 102 performs transmission power control, modulation/demodulation control, physical channel operation according to a multiple access method, and the like. In the layer 2 (data link layer), the radio communication section 102 performs transmission/reception in the radio link. In the layer 3 (network layer), the radio communication section 102 performs such operations as call control, line monitoring, and move management.

The storage section 103 is composed of various types of memories such as EEPROM (Electronically Erasable and Programmable Read Only Memory), and stores various programs, data and, especially, contents received from the content server 3. The input section 104 includes alphanumeric keys, buttons, switches, etc. used for input operation. The output section includes an LCD (Liquid Crystal Display), a speaker, and the like. The above-described sections are interconnected via a system bus.

In addition, the mobile terminal 1 further comprises a data communication section 11, a content storing section 14, a content reproducing section 15, and a reservation meta-data managing section 16. The data communication section 11 includes a reservation download processing means 12 and an immediate download processing means 13. The data communication section 11 handles data communication with the content server 3 by the use of the communication function of the radio communication section 102. The content storing section 14 stores content obtained by downloading from the content server 3 in the storage section 103, and manages the content. The content reproducing section 15 outputs the content stored in the storage section 103 to the output section 105 to reproduce the content. The content storing section 14 may be a device such as PDA (Personal Digital Assistant) connected to the mobile terminal 1 or a semiconductor memory card inserted therein, which implements the above-mentioned storing function when connected to the mobile terminal 1. The reservation download processing means 12, immediate download processing means 13 and reservation meta-data managing section 16 will be described later.

Figure 5:
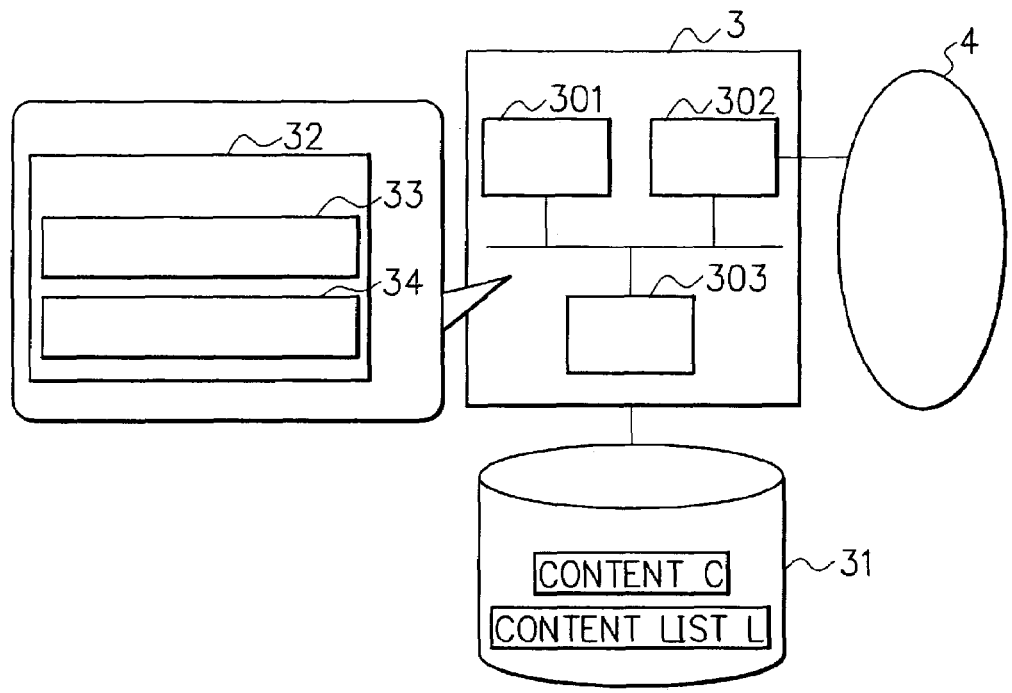
FIG. 5 is a block diagram showing the configuration of a content server depicted in FIG. 3.

FIG. 5 is a block diagram showing the configuration of the content server 3 of the first embodiment. The content server 3 is a server machine for sending content such as a moving image and music to the mobile terminal 1 via the wireless communication network 4 in response to a request from a user of the mobile terminal 1. As mentioned previously, the content server 3 is provided with the content managing means 31. The content managing means 31 stores/manages information necessary for content DL (download) service such as a content list L in addition to meta-data M and content data D of content C. In the content list L, there is described a list of contents in a prescribed form, which can be offered through the DL service in the data transmission/reception system 100. While in the data transmission/reception system 100 according to the first embodiment of the present invention, the content list L is managed by the content server 3, the content list L may be managed by a means provided to another constituent in the system 100.

The content server 3 comprises a control section 301, a communication section 302, and a storage section 303, which are interconnected via a system bus. The communication section 302 is a prescribed network I/F, and connected with the wireless communication network 4 by a fixed line. The communication section 302 has a function for data communication with the mobile terminals 1 via the radio base station 2. The control section 301 includes MPU, and controls the whole of the content server 3. The storage section 303 may be a disk storage unit or the like, and stores programs for implementing the functions of the content server 3 and various data. The programs are sequentially executed by the control section 301 to operate the content server 3. Additionally, the storage section 303 loads and stores the content C, etc. managed by the content managing means 31 as needed. The loaded content C is sent to the mobile terminal 1 through the communication section 302 in response to a DL request from a user of the mobile terminal 1.

Besides, the content server 3 further comprises a data communication section 32 for processing data communication with the mobile terminal 1 through the communication section 302. The data communication section 32 includes a reservation download request processing means 33 and an immediate download request processing means 34. The request processing means 33 and 34 perform operations corresponding to operations of the download processing means 12 and 13 in the mobile terminal 1.

Incidentally, the content managing means 31 may be a prescribed database management system, and formed as a node independent of the content server 3. The content server 3 may implement a content management/storage function in cooperation with another node computer (processor) or a network. The content server 3 is typically set on an IP network, and connected to the wireless communication network 4 via a gateway.

Figure 6:
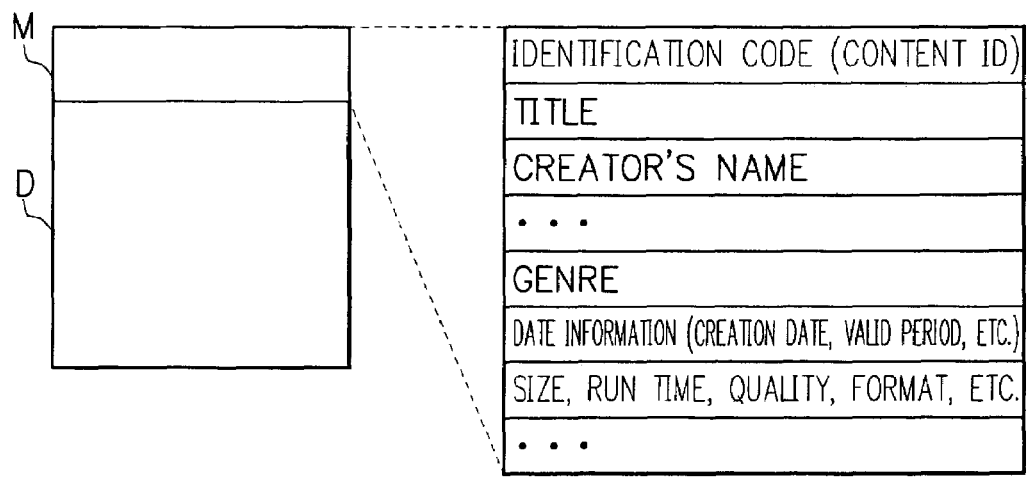
FIG. 6 is a diagram showing the logical configuration of a data record of content managed by a content managing means of the content server.
Figure 7:
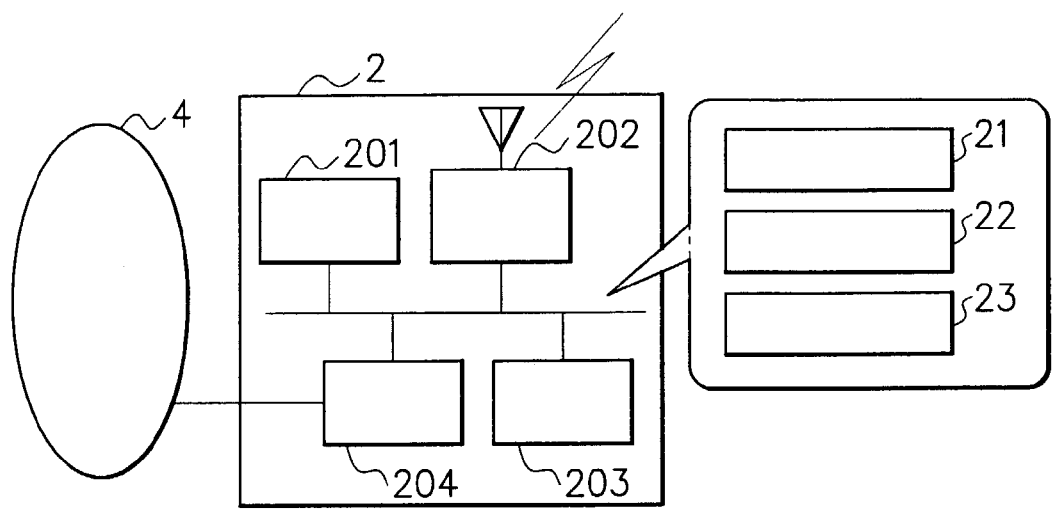
FIG. 7 is a diagram schematically showing the configuration of a radio base station (radio base station device) depicted in FIG. 3.

FIG. 6 is a diagram showing the logical configuration of a data record of content C managed by the content managing means 31 of the content server 3. Referring to FIG. 7, the data record of content C includes a meta-data section and a content data section. Meta-data M is registered in the meta-data section, while content data D is registered in the content data section. When content C is a moving image, for example, the content data D is moving image binary data in a prescribed format.

The meta-data M is data or information concerning content C described in a prescribed format. The meta-data M includes various attributes as information elements such as identification code (content ID), title, producer or creator's name, genre, date information (creation date, valid period, etc.), data size, run time, data quality, data format, and the like. There are conceivable attributes other than those described above. For example, when content C is music, the meta-data M include such attributes as singer or band's name, songwriter's name, and player's name. Each attribute has an attribute value.

The identification code (content ID) is a code for uniquely identifying content in the data transmission/reception system 100. The title is, for example, information about the title of a song and singer's name in the case of music content. The producer or creator is a person who produces or is responsible for content C, or a copyright holder. The genre indicates a category to which content C belongs. For example, the genres of music contents include "pops", "rock", "classical music" and the like, while the genres of moving image contents include "news", "drama", "movie" and the like.

FIG. 7 is a diagram schematically showing the configuration of the radio base station 2 (radio base station device) of the first embodiment. The radio base station 2 is a facility provided to the wireless communication network 4. There are a plurality of radio base stations in a communication service area. The radio base station 2 handles multiple accesses to the mobile terminals 1 in its radio communication zone (cell), and carries out data transmission/reception in the wireless section (radio link). The radio base station 2 comprises a control section 201, a radio communication section 202, a storage section 203, and a communication section 204. The control section 201 includes MPU, and controls the whole of the radio base station 2. The radio communication section 202 is provided with an antenna unit, and handles radio transmission/reception in the radio link between the mobile terminal 1 and radio base station 2. The storage section 203 includes such memories as ROM, RAM, etc., and stores programs and data. The communication section 204 handles communication in a fixed-line link between the radio base station 2 and wireless communication network 4, and executes data transmission/reception to/from the content server 3 as well as controlling communications with other facilities in the wireless communication network 4.

The radio base station 2 carries out each processing in the layers 1, 2 and 3 in wireless data communication network architecture. In the layer 1 (physical layer), the radio base station 2 performs transmission power control, modulation/demodulation control, physical channel operation according to a multiple access method, and the like. In the layer 2 (data link layer), the radio base station 2 performs transmission/reception in the radio link. In the layer 3 (network layer), the radio base station 2 performs line or channel control such as settings of radio channels.

Generally, radio channel allocation is carried out as control operation in the layer 3 according to a prescribed channel allocation method by a wireless network control station (not shown), etc. set in the wireless communication network 4. A radio channel is established and secured in the radio link between the mobile terminal 1 and radio base station 2 based on the radio channel allocation. The radio channel established in the radio base station 2 is notified to the mobile terminal 1 as control information, and the mobile terminal 1 performs radio channel setting according to the information.

Although not shown in FIG. 3, the wireless communication network 4 is generally provided with such facilities as wireless network control stations, gateways, location registration centers and the like. The wireless network control station (base station control station) is connected to a plurality of radio base stations via fixed-lines or radio links, and controls the radio base stations to control the entire radio communication system. In particular, the wireless network control station performs the control operation in the layer 3 such as call control and radio communication resource management. The gateway exchanges protocols with other networks such as the IP network. The location registration center keeps track of locations of the mobile terminals 1, which is to be referred to on the occasions of the radio channel allocation and the like. Since the above-mentioned facilities are not directly related to the Spresent invention, a detailed description thereof is unnecessary, and the following description will be given on the assumption that the radio base station 2 can perform the functions of the facilities.

Incidentally, in the data transmission/reception system of the present invention, the channel indicates a communication channel in logical sense and is not limited to that of multiple access methods. The data transmission/reception system of the present invention is applicable to known techniques such as CDMA (Code Division Multiple Access), TDMA (Time Division Multiple Access) and FDMA (Frequency Division Multiple Access). That is, in the case of CDMA, the channel (physical channel) is a spread code channel identified by a spread code. Besides, in the cases of TDMA and FDMA, a channel secured by time-divided time slots and a frequency-divided frequency band channel are used, respectively.

In the following description, it is assumed that the data transmission/reception system of the present invention is applied to a CDMA radio communication system, especially to a Wideband CDMA (W-CDMA) radio communication system (for more detail on the configuration of the W-CDMA system, refer to "WCDMA for UMTS", Harri Holma and Antti Toskala, 2001, John Wiley & Sons, Ltd., ISBN 0 471 486 87 6). Additionally, the channel allocation indicates the allocation of transport channels in W-CDMA, and implementation of physical channel allocation is not considered. Incidentally, in the architecture of W-CDMA, transport channels in the transport layer are located above physical channels in the physical layer (bottom layer). The allocation of the transport channels is carried out in the data link layer that is an upper layer of the transport layer. In the transport layer, mapping of the transport channels onto physical channels is performed to establish the physical channels (for more detail, refer to "Physical channels and mapping of transport channels onto physical channels", 3GPP TS 25. 211 V3. 9. 0, December 2001).

The channels secured in the radio links represent a valuable resource for radio communication carriers, and the transmission of the rich contents having a large amount of data such as moving images causes a deficiency in line or channel capacity in the radio links. In addition, it is costly to transmit the rich contents. In the transmission/reception system 100, downloads of the same content to the mobile terminals 1, namely, transmissions in radio downlinks (from the radio base station 2 to the mobile terminals 1) are simultaneously carried out through a downlink shared channel, thus enabling the effective utilization of communication resources (line or channel resources) in the radio links.

Besides, the radio base station 2 further comprises a dedicated communication means 21, a shared transmission means 22 and a broadcast means 23, which are concerned with characteristic operations in the data transmission/reception system 100. The dedicated communication means 21 processes the data communicated with the mobile terminals 1 and the wireless communication network 4 through the control section 201 to establish a dedicated channel for communication with one of the mobile terminals 1 in the radio link. The dedicated communication means 21 also performs bi-directional data communication via the dedicated channel. The shared transmission means 22 establish a downlink shared channel for transmission from the radio base station 2 to one or more mobile terminals 1 in the radio communication zone of the radio base station 2, and performs data transmission via the downlink shared channel. The broadcast means 23 simultaneously sends or broadcasts information to one or more mobile terminals 1 in the radio communication zone of the radio base station 2 through a prescribed broadcast channel.

A control channel for sending control information (for signaling) or a channel used for broadcasting type information distribution can be employed as the broadcast channel. The broadcast means 23 simultaneously sends a download notice (which will be described later) to all the mobile terminals 1 present in the radio communication zone of the radio base station 2 through the prescribed broadcast channel.

In W-CDMA, for example, DCH (Dedicated CHannel) can be used as the dedicated channel established by the dedicated communication means 21, and DSCH (Downlink Shared CHannel) can be used as the downlink shared channel established by the shared transmission means 22 (for more detail, refer to "UTRAN Functions, Examples on Signaling Procedures", 3GPP TR 25. 931 V3. 4. 0, June 2001). Besides, SMS (Short Message Service) by CBC (Cell Broadcast Center) can be used as the broadcast means 23.

Figure 8:
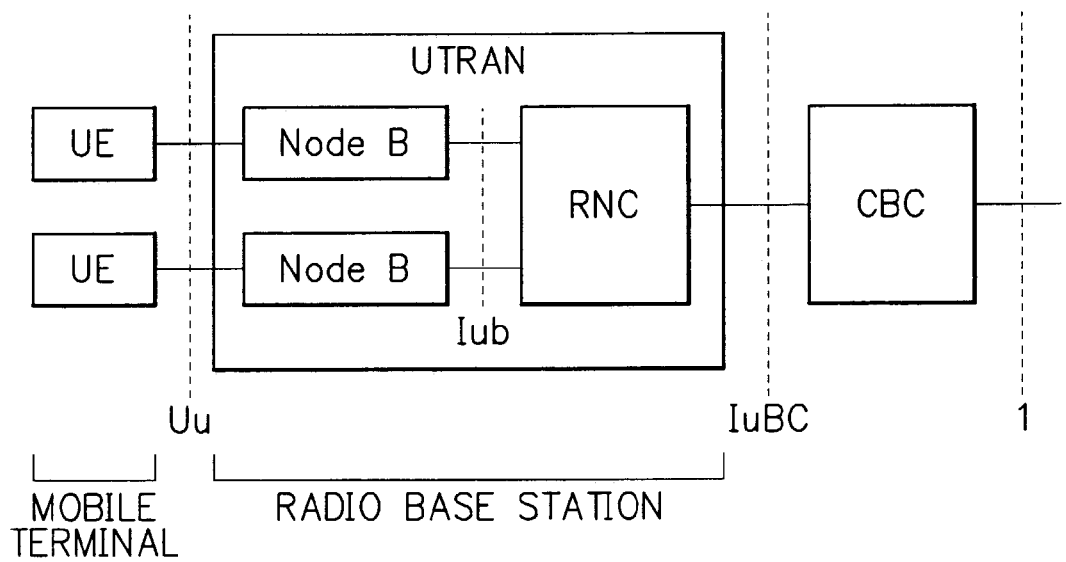
FIG. 8 is a diagram showing the configuration of a radio communication system provided with CBC as a constituent element of a broadcast means.

The CBC is a facility or equipment set in the W-CDMA wireless communication network to offer information broadcast service to user terminals in a prescribed cell (radio communication zone). FIG. 8 is a diagram showing the configuration of a radio communication system provided with the CBC as a constituent element of the broadcast means 23 (for more detail, refer to "Technical realization of Cell Broadcast Service", 3GPP TS 23. 041 V3. 4. 0, June 2001). In FIG. 8, UE indicates a user terminal, namely, corresponds to the mobile terminal 1. Node B indicates a radio base station, and RNC (Radio Network Controller) indicates a wireless network control station. The following description will be given on the assumption that the radio base station 2 has the functions of a combination of the Node B and RNC (UTRAN in FIG. 8). In the data transmission/reception system 100, the CBC is set in the wireless communication network 4. When the necessity for broadcasting arises, the CBC issues an "SMS broadcast instruction" to the Node Bs. The Node Bs simultaneously send an SMS message to all the UEs (mobile terminals 1) in the radio communication zone via the broadcast channel according to the SMS broadcast instruction.

The data transmission/reception system 100 according to the first embodiment of the present invention is broadly characterized in that: (1) a plurality of the mobile terminals 1 can share a downlink channel and receive (download) content; (2) users can receive contents in a manner fitting the prescribed requirements of the respective users unlike with the broadcasting type service in which users receive contents at predetermined time; and (3) users can download desired content from the beginning of its content data, and obtain the entire content.

In the data transmission/reception system 100, the shared transmission means 22 of the radio base station 2 establishes the downlink shared channel for common use by plural users on the occasion of transmitting content to one of the mobile terminals 1 so that the other mobile terminals 1 in the radio communication zone of the radio base station 2 can tune in to the downlink shared channel and receive the content. At this point, the broadcast means 23 of the radio base station 2 simultaneously sends notice (hereinafter referred to as a DL notice) to all the mobile terminals 1 in the radio communication zone to inform the start of the transmission of content via the downlink shared channel. The DL notice includes the meta-data of the outgoing content and information on the downlink shared channel. Having received the DL notice, the mobile terminals 1 tune in to the downlink shared channel specified by the DL notice. Thus, a plurality of the mobile terminals 1 can share the downlink shared channel and receive the content.

Besides, the data transmission/reception system 100 offers content download service tailored to users' individual needs. For example, some users put the immediate obtention of content above reasonable communication charges for download, while some would wish for communication charges and service charges as cheap as possible rater than immediate download. In accordance with the first embodiment of the present invention, the mobile terminal 1 is provided with the reservation download processing means 12 and immediate download processing means 13. The two download processing means carry out different types of downloading to satisfy the users' needs. That is, the download processing means 12 and 13 of the data communication section 11 perform downloading of content C through different procedures by using the radio communication section 102. The immediate download processing means 13 executes the immediate download (a download that starts immediately after the issuance of an request) of content C from the content server 3. The reservation download processing means 12 first reserves a download of desired content C, and executes downloading of the reserved content C from the radio base station 2 when prescribed download start conditions are satisfied. In other words, the reservation download processing means 12 executes downloading of the reserved content C when the same content C is transmitted to another mobile terminal 1 linked to the same radio base station 2 in response to its request for the immediate download of the content C. More specifically, the reservation download processing means 12 downloads the reserved content C after determining that the content C to be transmitted in the radio link is coincident with the reserved content C with reference to the meta-data M in the DL notice received from the radio base station 2.

For downloading content C, a user obtains the content list L from the content server 3 through the mobile terminal 1, and selects desired content C with reference to the content list L. At this point, the user can select either immediate download (immediate DL) or download after reservation (reservation DL).

In order to make a reservation for a download of the content C (DL reservation), the reservation download processing means 12 of the mobile terminal 1 sends a reservation DL request to the content server 3 to obtain the meta-data M of the desired content C. Subsequently, the reservation download processing means 12 stores the meta-data M in the reservation meta-data managing section 16 of the mobile terminal 1 as registered reservation information to make the DL reservation (the meta-data M managed by the reservation meta-data managing section 16 will be referred to as meta-data Mr). After that, the mobile terminal 1 enters the wait state for waiting the DL notice from the radio base station 2. In the case where the user reserves downloads of plural contents C through the mobile terminal 1, plural entries of the meta-data Mr are made in the reservation meta-data managing section 16.

In the data transmission/reception system 100, when content C is downloaded from the content server 3 in response to an immediate DL request issued by one of the mobile terminal 1, the radio base station 2 receives the meta-data M and content data D of the content C via the wireless communication network 4. Subsequently, the radio base station 2 allocates a channel for transmitting the content C, and simultaneously sends the DL notice to all the mobile terminals 1 in the radio communication zone through the broadcast means 23 to inform the start of the transmission of the content C via the allocated channel. Having received the DL notice, each mobile terminal 1 refers to the DL notice to determine whether or not the content C to be transmitted in the radio link is coincident with the content for which it has made a DL reservation. The coincidence of the contents is determined by matching check to collate the meta-data M in the DL notice with the meta-data Mr stored in the reservation meta-data managing section 16 as registered reservation information. For example, when the meta-data M and Mr each include a content ID (a code for uniquely identifying content) as an attribute, the attribute values of the respective content IDs are collated, and the outgoing content proves coincident with the reserved content when the two attribute values match. On the other hand, when the meta-data M and Mr do not include the attribute for uniquely identifying content such as the content ID, the coincidence of the contents is determined by comparing the attribute values of two or more attributes, for example, title and singer of both contents. When more than one attribute values of the contents match, respectively, the outgoing content proves coincident with the reserved content. Having determined that the outgoing content is coincident with the reserved content, the mobile terminal 1 tunes in to the channel specified by the DL notice, and downloads the content C. Incidentally, in the data transmission/reception system 100, a channel that can be shared by plural mobile terminals 1 for data transmission/reception is established by the channel allocation.

The immediate download processing means 13 of the mobile terminal 1 executes the immediate download of content C from the content server 3. The user who receives the immediate DL service is unconscious of operation involved in the DL reservation in the data transmission/reception system 100. The immediate download processing means 13 downloads content C through the radio communication section 102. When receiving the content C, a link with the content server 3 as well as a channel for downloading in the radio link between the mobile terminal 1 and radio base station 2 is secured in the data transmission reception system 100, and the mobile terminal 1 receives the content C via the channel. The channel is allocated by the shared transmission means 22 of the radio base station 2 as a shared channel. The shared channel is used in common when the mobile terminal(s) 1 which has made a DL reservation performs downloading of the reserved content C. The mobile terminal 1 which has issued the immediate DL request receives the content C via the shared channel, and thus the procedure for obtaining the content C is completed.

As described above, in the data transmission/reception system 100, a plurality of the mobile terminals 1 simultaneously receive or download the same content C via the shared channel in the radio links between the mobile terminals 1 and radio base station 2. Concretely, with the issuance of an immediate DL request for content C, all the mobile terminals 1 which have made DL reservations for the content C in the radio communication zone of the radio base station 2 simultaneously receive the same data via the shared channel to obtain the content C. Accordingly, downloads of content for the plural mobile terminals 1 are performed collectively, thus saving communication resources in the radio links.

Figure 9:
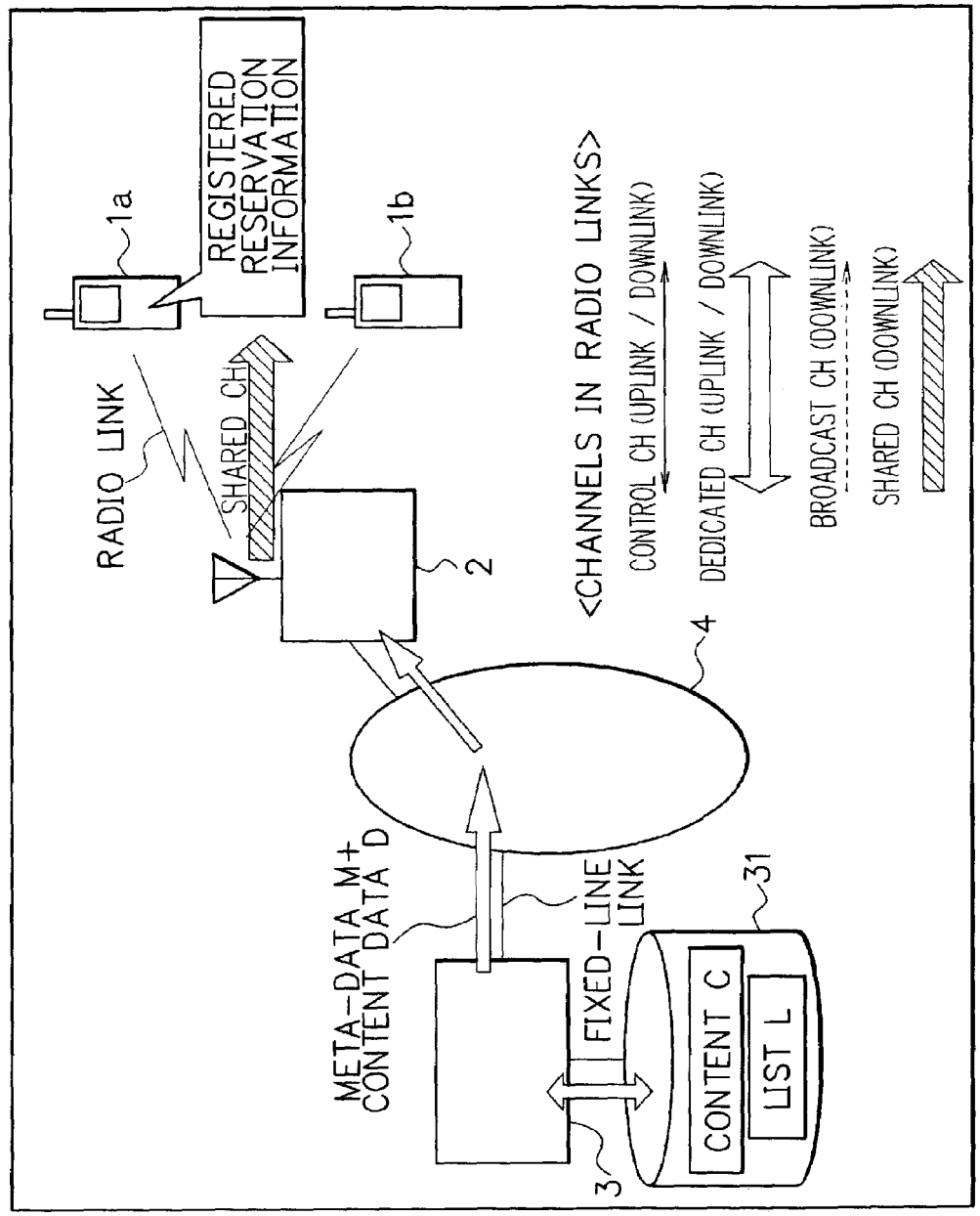
FIG. 9 is a diagram showing each channel used in a route of content downloading and radio links.

FIG. 9 is a diagram showing each channel used in a route of content downloading and in the radio links. In the following description, the user who receives reservation DL service with respect to content C is referred to as user a, and the mobile terminal 1 of the user a is referred to as mobile terminal 1a. Besides, the user and his/her mobile terminal 1 that receives immediate DL service with respect to the same content C as reserved by the user a are referred to as user b and mobile terminal 1b, respectively. The mobile terminal 1a has made an entry of meta-data Mr as registered reservation information in the reservation meta-data managing section 16.

With the occurrence of an immediate DL request at the mobile terminal 1b, the content C (content data D and meta-data M) is sent to the wireless communication network 4 from the content server 3 via a fixed-line link where, for example, the TCP/IP (transmission control protocol/internet protocol) is employed. The content C is then sent to the radio base station 2 through a fixed-line link in the wireless communication network 4. Subsequently, the content C is delivered to the mobile terminals 1a and 1b via a shared channel secured in the radio links.

In FIG. 9, each channel used in radio links for downloading content C is a W-CDMA channel. The channel can be used in other systems. Among the channels, the "control CH" is a channel for communication control between the mobile terminals 1 and radio base station 2, and used for call-out/call-in, etc. on the occasion when radio communication is established. Since the control CH is used before the "dedicated CH" is set, predetermined uplink and downlink channels are used as the control CHs for all the mobile terminals 1 in the radio communication zone of the radio base station 2. The "dedicated CH" is a channel for bi-directional (uplink/downlink) communication between one of the mobile terminals 1 and the radio base station 2, and used for telephone calls and data communication. The "broadcast CH" is a downlink channel for broadcast data transmission to all the mobile terminals 1 in the radio communication zone of the radio base station 2, and set by the broadcast means 23. The "shared CH" is a downlink channel shared with one or more mobile terminals 1, and set by the shared transmission means 22.

The mobile terminal 1 communicates with the content server 3 through the data communication section 11, and makes a request for the content list L offered by the content server 3 to obtain the list L. The mobile terminal 1 may obtain the content list L by making a request in each case, or may obtain the list L previously and refer the stored list L. Besides, the content list L may be obtained through broadcasting type information distribution service. The mobile terminal 1 displays the content list L on the output section 105 according to user's operation of the input section 104. The user selects desired content, namely, content that he/she wishes to obtain by downloading from the displayed content list L. The user also selects either "immediate DL" or "reservation DL". Incidentally, information display and input operations, etc. in the mobile terminal 1 is executed through a prescribed user I/F provided by the mobile terminal 1.

Figure 10:
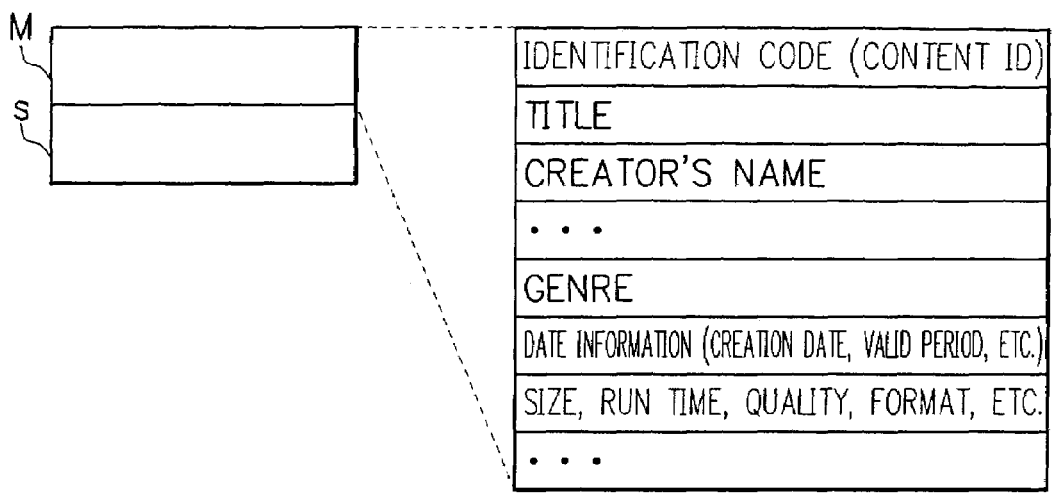
FIG. 10 is a diagram showing the logical configuration of a download notice simultaneously notified to mobile terminals in the radio communication zone of the radio base station.

FIG. 10 is a diagram showing the logical configuration of the DL notice simultaneously notified to all the mobile terminals 1 in the radio communication zone of the radio base station 2. The DL notice includes the meta-data M and shared channel information s. The meta-data M is the meta-data of content C to be transmitted via the shared channel in the radio link. The shared channel information s is designating information for informing the allocated shared channel. The shared channel (hereinafter referred to as shared channel s) is a downlink shared channel allocated in the radio links between the mobile terminals 1 and radio base station 2 on the occurrence of the immediate DL request. In the case where, when a user makes a request for the immediate DL of content C, there is the mobile terminal 1 which has made a DL reservation for the same content C in the radio communication zone of the same radio base station 2, a channel allocated for the immediate DL (dedicated to the user) is used as the shared channel for common use by plural users.

Having received the DL notice simultaneously sent from the radio base station 2, each of the mobile terminals 1 in the radio communication zone of the radio base station 2 refers to the meta-data M in the DL notice for matching check. In the matching check, the mobile terminal 1 collates the meta-data M with the meta-data Mr stored in the reservation meta-data managing section 16 as registered reservation information. Accordingly, it is determined whether or not the content C to be transmitted from the radio base station 2 is coincident with the content for which the mobile terminal 1 has made a DL reservation.

When there is an entry of the meta-data Mr matches the meta-data M as a result of the matching check, the mobile terminal 1 determines that the outgoing content C is coincident with the reserved content, and refers to the shared channel information s in the DL notice to tune in to the designated shared channel s. After that, the mobile terminal 1 starts downloading of the content C via the shared channel s to obtain the desired content C, and thus the reservation DL is completed. In the case where there are the plural mobile terminals 1 which have made DL reservations for the same content C in the radio communication zone of the radio base station 2, the shared channel s is used to execute the reservation DL for the plural mobile terminals 1 and the immediate DL.

Figure 11:
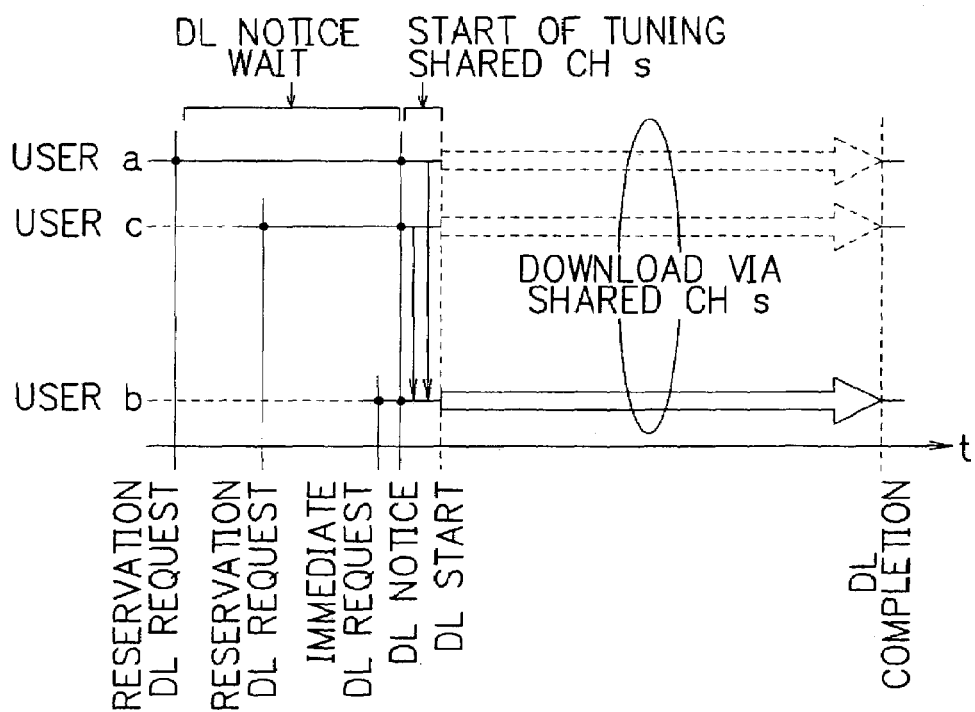
FIG. 11 is a diagram schematically showing download process on a time axis in the data transmission/reception system depicted in FIG. 3.

FIG. 11 is a diagram schematically showing download process on a time axis in the data transmission/reception system 100 of the first embodiment. In FIG. 11, user a and user c indicate users who carry out the reservation DL. User b indicates a user who carries out the immediate DL. Referring to FIG. 11, the mobile terminal 1a of the user a issues a reservation DL request for content C at first. Then, mobile terminal 1c of the user c also issues a reservation DL request for the same content C while the mobile terminal 1a of the user a is in the wait state for waiting the DL notice. After that, the mobile terminal 1b of the user b issues an immediate DL request. With the occurrence of the immediate DL request, the content data D and meta-data M of the content C are sent to the radio base station 2 from the content server 3. On beginning to receive the content data D and meta-data M of the content C, the radio base station 2 allocates the shared channel s for data transmission, and simultaneously sends the DL notice including the meta-data M and shared channel information to all the mobile terminals 1 in the radio communication zone of the radio base station 2. Having received the DL notice, the mobile terminals 1a and 1c of the users a and c determine that the outgoing content C is coincident with the reserved content C, and tune in to the designated shared channel. Thus, the mobile terminals 1a and 1c receive the content C via the shared channel s together with the immediate DL operation for the mobile terminal 1b of the user b. Incidentally, only the content data D of the content C may be sent to the mobile terminals 1a and 1c since the mobile terminals have already obtained the meta-data M. On the other hand, the mobile terminal 1b that has issued the immediate DL request receives both content data D and meta-data D of the content C via the shared channel s. While in the above description, the reservation DL is performed for two users a and c, the number of users who simultaneously receive the data varies according to circumstances.

Figure 12:
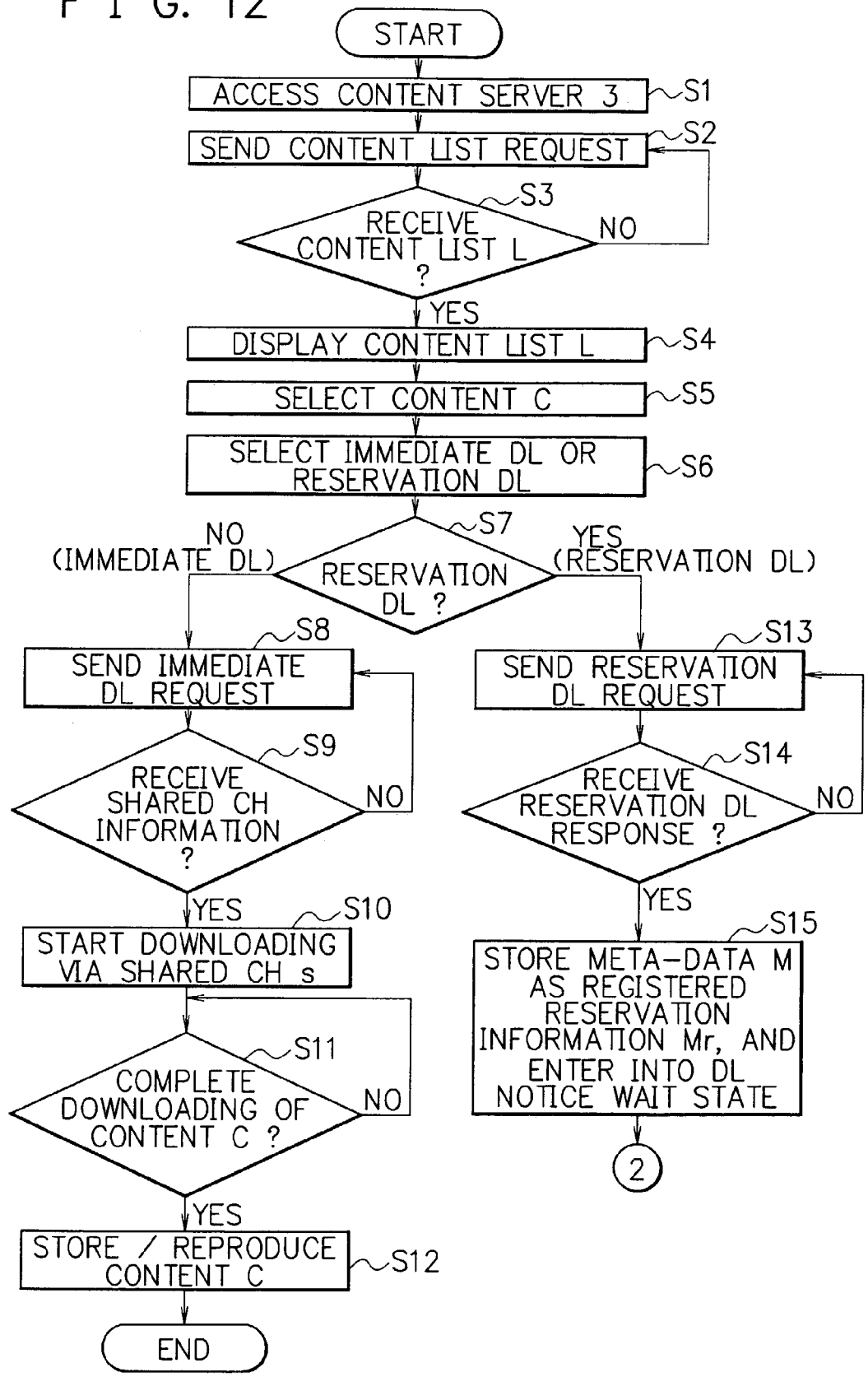
FIG. 12 is a flowchart showing a procedure for making download requests for content on the mobile terminal according to the first embodiment.

In the following, a description will be given of the operation of each constituent in the data transmission/reception system 100 according to the first embodiment of the present invention. FIG. 12 is a flowchart showing a procedure performed by the mobile terminal 1 to make the DL requests for content C. Moving image data will be taken as an example of the content C. First, when a user intends to download the content C, the user accesses the content server 3 through his/her mobile terminal 1 (step S1). Subsequently, the user requests the list L of moving image contents by sending a content list request to the content server 3 (step S2). Having received the content list L from the content server 3 (step S3, YES), the mobile terminal 1 displays the content list L on the output section 105 (step S4), so that the user can select desired content therefrom (step S5). On this occasion, the user also selects either immediate download (immediate DL) or download reservation (reservation DL) for downloading the selected content C (step S6).

When the user selects the immediate DL (step S7, NO), the immediate download processing means 13 sends an immediate DL request to the content server 3 (step S8). The immediate DL request includes information on the selected content C such as the content ID. In response to the immediate DL request, the content server 3 starts the transmission of the content C. Along with the start of the transmission, the radio base station 2 allocates the shared channel s for the mobile terminal 1 that has made the immediate DL request, and notifies the mobile terminal 1 of the shared channel s as control information. When receiving the control information about the shared channel s from the radio base station 2 (step S9, YES), the mobile terminal 1 establishes the shared channel s in the radio link, and tunes in to the shared channel s to download the content C (step S10). The mobile terminal 1 receives the entire data (content data D and meta-data M) of the desired content C, from beginning to end, as an immediate DL response and completes downloading of the content C (step S11, YES). The content C is stored in the content storing section 14, and reproduced by the content reproducing section 15. After that, the mobile terminal 1 cuts off the access to the content server 3 if not needed, and completes the immediate DL operation (step S12).

On the other hand, when the user selects the reservation DL (step S7, YES), the reservation download processing means 12 sends a reservation DL request to the content server 3 (step S13). The reservation DL request is a message for requesting the meta-data M of the selected content C, and includes information on the selected content C such as the content ID. In response to the reservation DL request, the content server 3 sends a reservation DL response that includes the meta-data M of the selected content C. When receiving the reservation DL response from the content server 3 (step S14, YES), the reservation meta-data managing section 16 stores the meta-data M as registered reservation information Mr, and the mobile terminal 1 enters into the DL notice wait state (step S15). The procedure is continued on FIG. 13.

FIG. 13 is a flowchart showing a procedure performed by the mobile terminal 1 after the DL notice wait state until the completion of the reservation DL. In the DL notice wait state, the mobile terminal 1 waits to receive the DL notice broadcasted by the radio base station 2 (step S21). Having received the DL notice (step S21, YES), the mobile terminal 1 carries out matching check and compares the meta-data M in the DL notice with the meta-data Mr stored in the reservation meta-data managing section 16 as registered reservation information (step S22). When there is a matching entry (step S23, YES), the mobile terminal 1 determines that the content to be transmitted in the radio link is coincident with the content for which the mobile terminal 1 has made a DL reservation, and tunes in to the shared channel s specified by the shared channel information s in the DL notice (step S24). Thus, the mobile terminal 1 receives the content C via the shared channel s (step S25). The mobile terminal 1 receives the entire data of at least content data D of the desired content C, from beginning to end. On the other hand, when there is no matching entry, (step S23, NO), the mobile terminal 1 determines that the content to be transmitted in the radio link is not coincident with the content for which the mobile terminal 1 has made a DL reservation, and continues to wait for the DL notice in the DL notice wait state without following the steps after step S 24.

Incidentally, when there is a matching entry (step S23, YES), a confirmation message such as "Download the content?" may be output through the output section 105 for a predetermined period of time (e.g. five seconds) with ring tone, and the content C may be downloaded only when "Yes" is selected by the user within the predetermined period of time. In this case, the radio base station 2 delays the transmission of the content C through the shared channel s by the predetermined period of time.

After the completion of the reservation DL, the reservation download processing means 12 stores the obtained content C in the content storing section 14, and reproduces it by the content reproducing section 15 (step S26). Incidentally, the process of storing/reproducing the content C varies depending on the nature of the content C and individual user's selection. After that, the reservation meta-data managing section 16 deletes or clears the meta-data Mr of the downloaded content C (step S27), and checks whether or not there is another meta-data Mr for DL reservation (step S28). When there is another meta-data Mr for DL reservation (step S28, YES), the mobile terminal 1 waits to receive another DL notice in the DL notice wait state. When there is no meta-data Mr for DL reservation (step S28, NO), the mobile terminal 1 awakes from the DL notice wait state (step S29).

Figure 14:
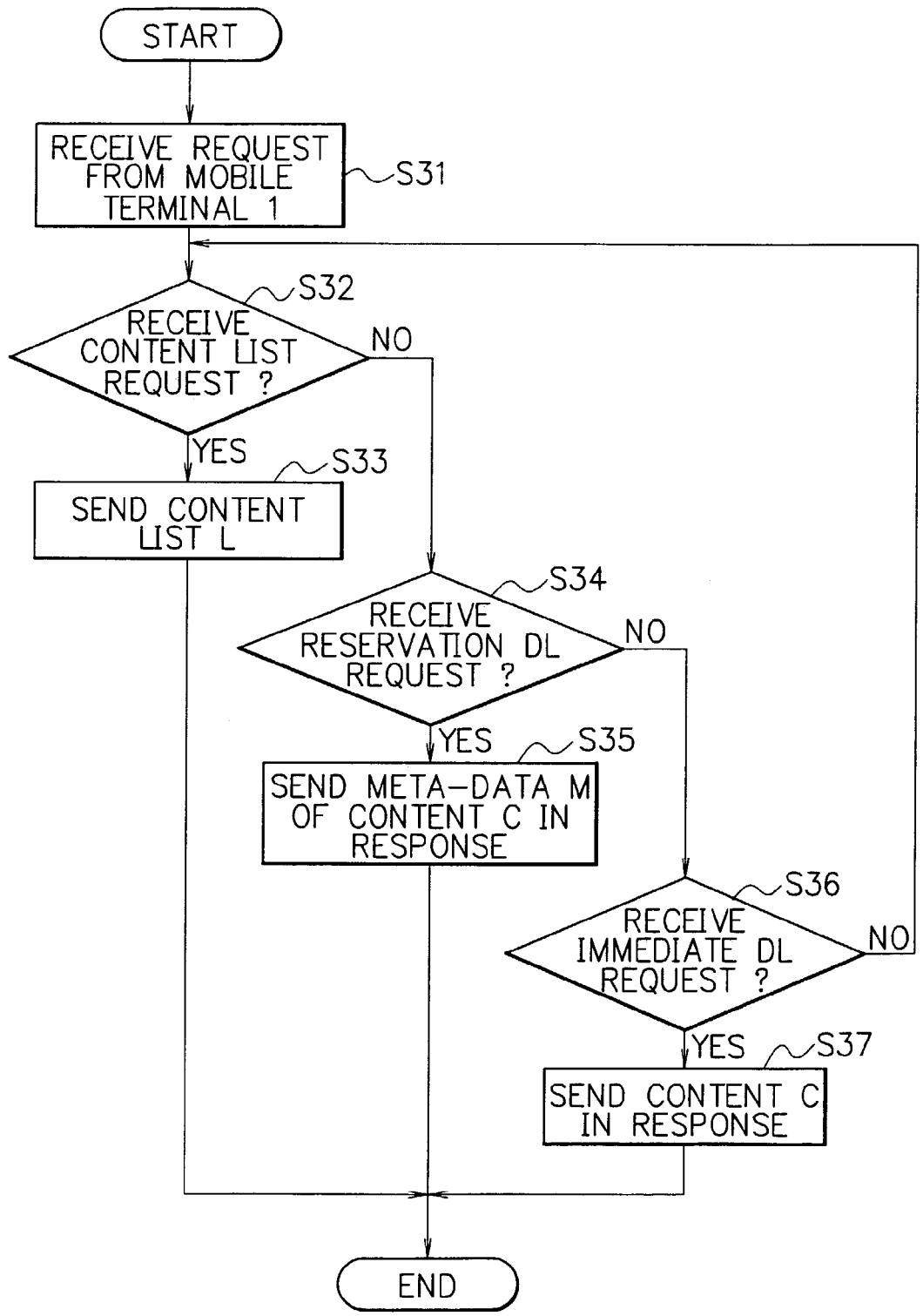
FIG. 14 is a flowchart showing a procedure in the content server according to the first embodiment.

FIG. 14 is a flowchart showing a procedure performed by the content server 3 in the data transmission/reception system 100. Basically, the content server 3 carries out response operation in response to requests from the mobile terminals 1. When receiving a request from the mobile terminal 1 (step S31), and in the case where the request is the content list request (step S32, YES), the content server 3 returns the list L of contents to the mobile terminal 1 (step S33). When receiving a reservation DL request (step S34, YES), the content server 3 returns the meta-data M of the content C specified by the mobile terminal 1 as the reservation DL response (step S35). Besides, when receiving an immediate DL request (step S36, YES), the content server 3 returns the content C (a set of the content data D and meta-data M) specified by the mobile terminal 1 as the immediate DL response (step S37).

Figure 15:
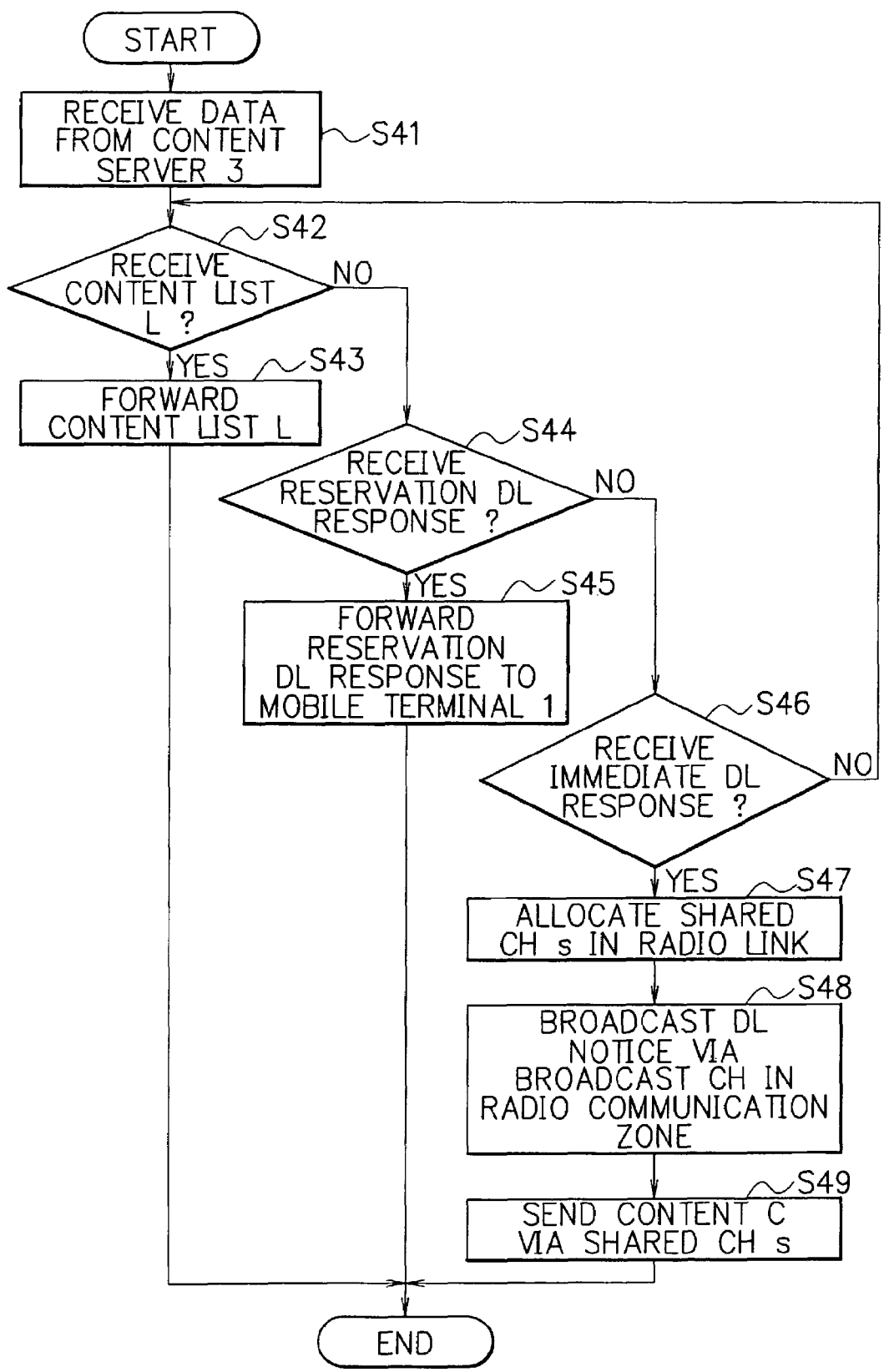
FIG. 15 is a flowchart showing a procedure in the radio base station according to the first embodiment.

FIG. 15 is a flowchart showing a procedure performed by the radio base station 2 in the data transmission/reception system 100. Basically, the radio base station 2 performs transfer operation, and forwards data received from the content server 3 to the mobile terminals 1. When receiving data from the content server 3 (step S 41), and in the case where the data is the content list L (step S42, YES), the radio base station 2 forwards the content list L to the mobile terminal 1 (step S43). When receiving the reservation DL response (information including the meta-data M) (step S44, YES), the radio base station 2 forwards the reservation DL response to the mobile terminal 1 (step S45). Besides, the radio base station 2 transfers data received from the mobile terminals 1 such as immediate DL requests and reservation DL requests to the content server 3.

In the case where the data received from the content server 3 is the immediate DL response (a set of the content data D and meta-data M) with respect to the content C (step S46, YES), the shared transmission means 22 of the radio base station 2 allocates the shared channel s in the radio link between the mobile terminal 1 which has made the immediate DL request and the radio base station 2 (step S47). Subsequently, the broadcast means 23 simultaneously sends the DL notice to all the mobile terminals 1 in the radio communication zone of the radio base station 2 via the prescribed broadcast channel (step S48). As the DL notice, the radio base station 2 prepares a set of the meta-data M of the content C to be transmitted via the shared channel s and shared channel information s. After broadcasting the DL notice, the radio base station 2 starts transmitting the data (content data D and meta-data M) received from the content server 3 to the mobile terminal(s) 1 via the shared channel s (step S49).

Incidentally, while in the above description, the reception of the DL response from the content server 3 triggers subsequent processes such as the allocation of the shared channel s, the radio base station 2 may first detect the size of received data when receiving the data from the content server 3 at step S41. In this case, the radio base station 2 may proceed on to the next step (step S42/S44/S46) only when, for example, the data size exceeds a predetermined threshold.

FIG. 16 is a sequence diagram showing a flow of concrete download process in the data transmission/reception system 100. In FIG. 16, each message communicated in the radio link between the mobile terminal 1 and radio base station 2 is indicated in the form "channel name: communicated data/operation", while each message communicated in the fixed-line link between the radio base station 2 and content server 3 is indicated in the form "protocol name: communicated data/operation". As can be seen in FIG. 16, the IP protocol is employed in the fixed-line link between the radio base station 2 and content server 3. Additionally, respective channels used in the radio link are aforementioned W-CDMA channels.

Referring to FIG. 16, the mobile terminal 1a that is carries out the reservation DL first sends an access request to the radio base station 2 through the control channel (CH). The radio base station 2 allocates a dedicated CH1 in the radio link between the mobile terminal 1a and the radio base station 2, and notifies the mobile terminal 1a about this through the control CH. Accordingly, the mobile terminal 1a establishes the dedicated CH1. The user of the mobile terminal 1a selects content C for reservation DL (p1). The mobile terminal 1a sends a reservation DL request to the content server 3 through the dedicated CH1 allocated by the radio base station 2. The reservation DL request includes the network address of the content server 3, the content ID of the content C for reservation DL, or URI (Uniform Resource Identifier).

Having received the reservation DL request from the mobile terminal 1a, the radio base station 2 forwards the request to the content server 3 via the wireless communication network 4. When receiving the reservation DL request, the content server 3 returns a message including the meta-data M of the selected content C (reservation DL response) in response to the reservation DL request (p2). The reservation DL response (meta-data M) is sent to the mobile terminal 1a through the dedicated CH1 via the radio base station 2.

The mobile terminal 1a receives the reservation DL response (meta-data M) from the content server 3, and stores the received meta-data M as registered reservation information Mr (p3). After that, the mobile terminal 1a enters the DL notice wait state (t1), and once cuts off the access (dedicated CH1) to the content server 3.

Besides, it is assumed that another mobile terminal 1b issues an immediate DL request for the same content C while the mobile terminal 1a is in the DL notice wait state after making the above-mentioned DL reservation. In this case, the mobile terminal 1b makes a request with the radio base station 2 for an access to the content server 3 through the control CH. The radio base station 2 allocates a dedicated CH2 in the radio link between the mobile terminal 1b and the radio base station 2, and notifies the mobile terminal 1b about this through the control CH.

The mobile terminal 1b sends an immediate DL request to the content server 3 through the dedicated CH2 allocated by the radio base station 2. The radio base station 2 forwards the immediate DL request from the mobile terminal 1b to the content server 3 via the wireless communication network 4.

When receiving the immediate DL request from the mobile terminal 1b, the content server 3 starts transmitting the selected content C in response to the immediate DL request (p4). Accordingly, the content C (a set of the content data D and meta-data M) is sent to the mobile terminal 1b.

On beginning to receive the content C (content data D and meta-data M) from the content server 3, the shared transmission means 22 of the radio base station 2 allocates a shared CH used for the immediate DL in the radio link between the mobile terminal 1b and the radio base station 2 by using the control CH. Subsequently, the broadcast means 23 of the radio base station 2 simultaneously sends the DL notice including the received meta-data M and shared channel information s (information on the allocated shared channel) to all the mobile terminals 1 in the radio communication zone of the radio base station 2 via the broadcast channel.

Having received the DL notice from the radio base station 2, each of the mobile terminals 1 in the radio communication zone carries out matching check and compares the meta-data M in the DL notice with the meta-data Mr stored in the reservation meta-data managing section 16 as registered reservation information to determine whether or not the outgoing content is coincident with the content for which the mobile terminal 1 has made a DL reservation (p5). When the received meta-data M matches the stored meta-data Mr, the mobile terminal 1 determines that the outgoing content is coincident with the reserved content C, and tunes in to the specified shared CH with reference to the shared channel information s (shared CH setting) in the DL notice. Thus, the mobile terminal 1 starts receiving the content C via the shared CH.

At this point, the mobile terminals 1 among those in the radio communication zone of the radio base station 2, which have not made reservation DL requests, or which have made reservation DL requests for other contents C, do not start receiving the content C since there is found no meta-data Mr matching the received meta-data M by the matching check. On the other hand, when one or more mobile terminals 1 other than the mobile terminal 1a have made DL reservations for the same content C, the plural mobile terminals 1 simultaneously receive the content C via the shared CH along with the immediate DL to the mobile terminal 1b.

After sending the DL notice to the mobile terminals 1, the radio base station 2 starts transmitting the content C (content data D and meta-data M) to the mobile terminal 1b via the shared CH allocated in the radio link.

Having received the entire data of the content C via the shared CH, the mobile terminal 1b cuts off the dedicated CH2 (completion of the immediate DL). At the same time, the mobile terminal 1a has also received the entire data of the content C via the shared CH (completion of the reservation DL).

Incidentally, in the data transmission/reception system 100, the dedicated channel for bi-directional (uplink and downlink) data communication is also allocated in the radio link when executing the immediate DL to maintain the session of the immediate DL operation. The uplink channel can be used for controlling data retransmission.

When the immediate download processing means 13 of the mobile terminal 1b has complete the reception of the content C, the content storing section 14 stores the content C, or the content reproducing section 15 reproduces the content C if necessary (p6). In the case where the immediate DL is selected on the mobile terminal 1, general downloading is performed except for the broadcast operation in which the radio base station 2 and content server 3 broadcast the DL notice to the mobile terminals 1 When the reservation download processing means 12 of the mobile terminal 1a has complete the reception of the content C, the content storing section 14 stores the content C, or the content reproducing section 15 reproduces the content C if necessary (p6).

In the following, a description will be given of a data transmission/reception system 200 according to the second embodiment of the present invention. In the data transmission/reception system 200, the mobile terminal 1 waits for a prescribed period of time T in the DL notice wait state differently from the mobile terminal 1 in the data transmission/reception system 100. When the mobile terminal 1 does not receive the DL notice with respect to the content C for which the mobile terminal 1 has made a DL reservation during the waiting time T, the mobile terminal 1 makes an immediate DL request for the reserved content C to the content server 3 to obtain the content C.

After the issuance of the reservation DL request, the reservation download processing means 12 obtains the meta-data M of the content C, and stores the meta-data M as registered reservation information, thereby completing the DL reservation process. Subsequently, the mobile terminal 1 goes into the DL notice wait state. At this point, the mobile terminal 1 begins time count, and waits for the DL notice while taking the time count. When receiving the DL notice during the waiting time T, the mobile terminal 1 receives the reserved content C in the same manner as described previously for the data transmission/reception system 100 of the first embodiment.

On the other hand, when the mobile terminal 1 does not receive the DL notice during the waiting time T and a time-out occurs, the mobile terminal 1 makes an immediate DL request for the reserved content C to the content server 3 to execute the immediate DL of the content C.

FIG. 17 is a diagram showing the DL notice wait operation of the time T in the data transmission/reception system 200. After the time out, the immediate download processing means 13 carries out the immediate DL operation in the same manner as described previously in the first embodiment.

By setting the waiting time T, a time limit for waiting the DL notice is defined, namely, maximum waiting time for the DL notice with respect to the reservation DL for a certain content C is determined. Users may determine the waiting time T for the reservation DL of the desired content C. The length of the waiting time T may be set or selected by each user, for example, by the minute, by the hour, by the day, and the like. In this case, when the mobile terminal 1 receives the meta-data M in response to a reservation DL request, the waiting time T is set before storing the meta-data M. The setting value of the waiting time T may be informed to the radio base station 2 or content server 3 so that it can be used as accounting information.

Besides, it is possible to set a maximum permissible value of the waiting time T (an upper limit of the setting value) in the data transmission/reception system 200 since it is not practical to delay downloading of content unduly. In the case where the data transmission/reception system 200 provides the setting of a maximum permissible value of the waiting time T, for example, the content server 3 sends the maximum permissible value together with the meta-data M to the mobile terminals 1, so that the respective mobile terminals 1 can carry out the DL notice wait operation based on the maximum permissible value. Alternatively, the maximum permissible value may be set in advance as a function of the mobile terminal 1.

Figure 18:
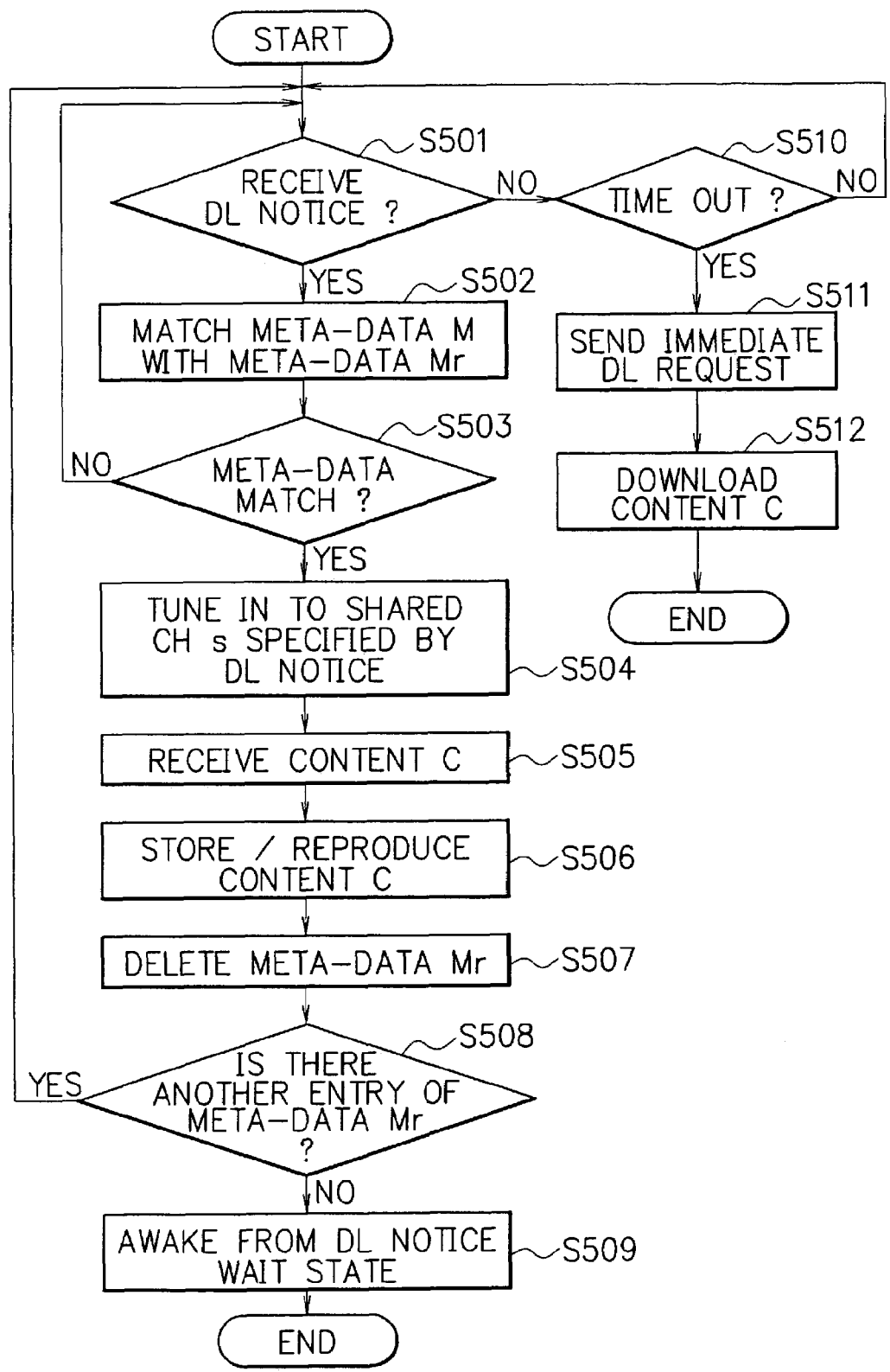
FIG. 18 is a flowchart showing a procedure from download notice wait state until the completion of downloading in the mobile terminal according to the second embodiment.

FIG. 18 is a flowchart showing a procedure performed by the mobile terminal 1 after the DL notice wait state until the completion of downloading in the data transmission/reception system 200 according to the second embodiment of the present invention. In FIG. 18, the steps from S501 to S509 are the same as described previously for the steps from S21 to S29 in FIG. 13. In addition to the common processes (steps from S501 to S509), the mobile terminal 1 in the second embodiment determines whether or not the waiting time T (a time limit with regard to the reservation DL for content C) has lapsed. When the waiting time T has lapsed without receiving the DL notice (step S510, YES), the mobile terminal 1 sends an immediate DL request for the reserved content C to the content server 3 (step S511). Subsequently, the mobile terminal 1 downloads the content C via the shared channel s (step S512). The mobile terminal 1 obtains the content C, and accomplishes downloading. At steps S511 and S512, the same processes of the immediate DL as performed in the steps from S8 to S12 (FIG. 12) are executed.

In the following, a description will be given of a data transmission/reception system 300 according to the third embodiment of the present invention. In the data transmission/reception system 300, the mobile terminal 1 carries out data complementary process for complementing the content data in addition to the above-mentioned processes performed by the mobile terminal 1 in the data transmission/reception system 100 or 200 when the mobile terminal 1 was not able to obtain the entire content data for any reason while downloading the reserved content C via the shared channel s. When the mobile terminal 1 has not received the entire content data of content C, the mobile terminal 1 requests the radio base station 2 to send missing data packets of the content C. Accordingly, the mobile terminal 1 obtains the missing data packets, thereby complementing the content data of the content C.

For example, the mobile terminal 1 cannot obtain the entire content data when downloading the reserved content C via the shared channel s in the case where the downloading is suspended for any reason, or data packets are lost in the radio link. In the data complementary process, the mobile terminal 1 makes a missing data request (a request for unreceived data packets) to the radio base station 2 based on sequence information as to data packets.

Figure 19:
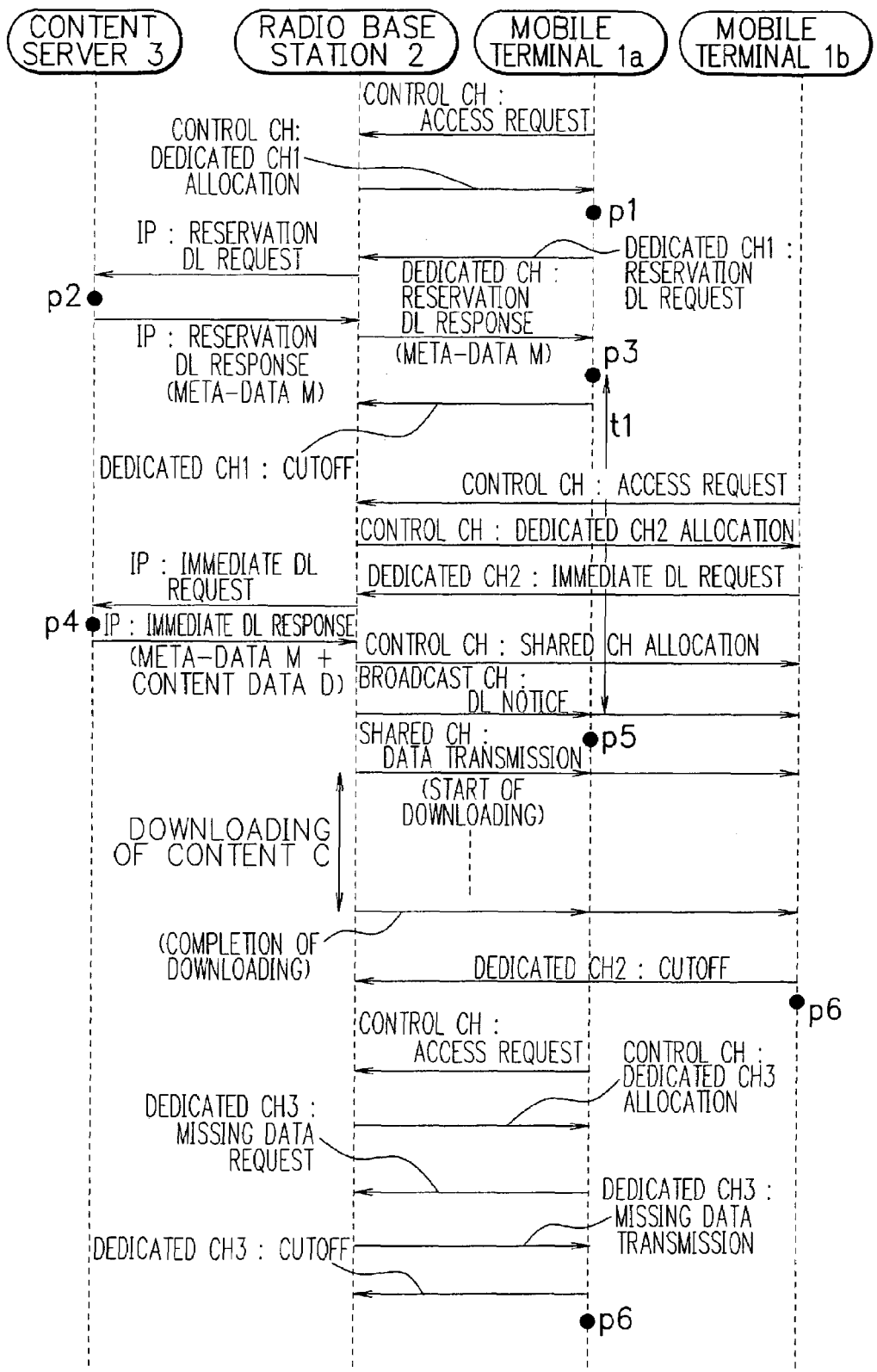
FIG. 19 is a sequence diagram showing a flow of download process in the data transmission/reception system according to the third embodiment of the present invention.

FIG. 19 is a sequence diagram showing a flow of download process including the data complementary process in the data transmission/reception system 300. The same basic processes as described previously in the first embodiment are performed for downloading of content C via the shared CH from beginning to end. When the mobile terminal 1a was not able to obtain the entire content data D of the content C for any reason while downloading the content C through the shared CH, the mobile terminal 1a sends an access request to the radio base station 2 through the control CH. The radio base station 2 allocates a dedicated CH3 so that the mobile terminal 1a can establish the dedicated CH3. Accordingly, the mobile terminal 1a sends a missing data request to the radio base station 2 via the dedicated CH3. Having received the missing data request, the radio base station 2 sends missing data packets to the mobile terminal 1a via the dedicated CH3. After receiving the missing packets to complement the content data D of the content C, the mobile terminal 1a cuts off the dedicated CH3.

The data complementary process is carried out in the process of receiving the content C (at step S25 in the flowchart of FIG. 13 or S505 in the flowchart of FIG. 18). Additionally, it is undesirable in terms of communication charges or traffic to retransmit so many amounts of missing data. Therefore, when the mobile terminal 1 has the reception of, for example, not more than 20% of the content data D of the desired content C, the mobile terminal 1 may wait for another DL notice without making the missing data request, and obtain the content C on the next occasion. The threshold of the reception may be specified by the data transmission/reception system 300.

Figure 20:
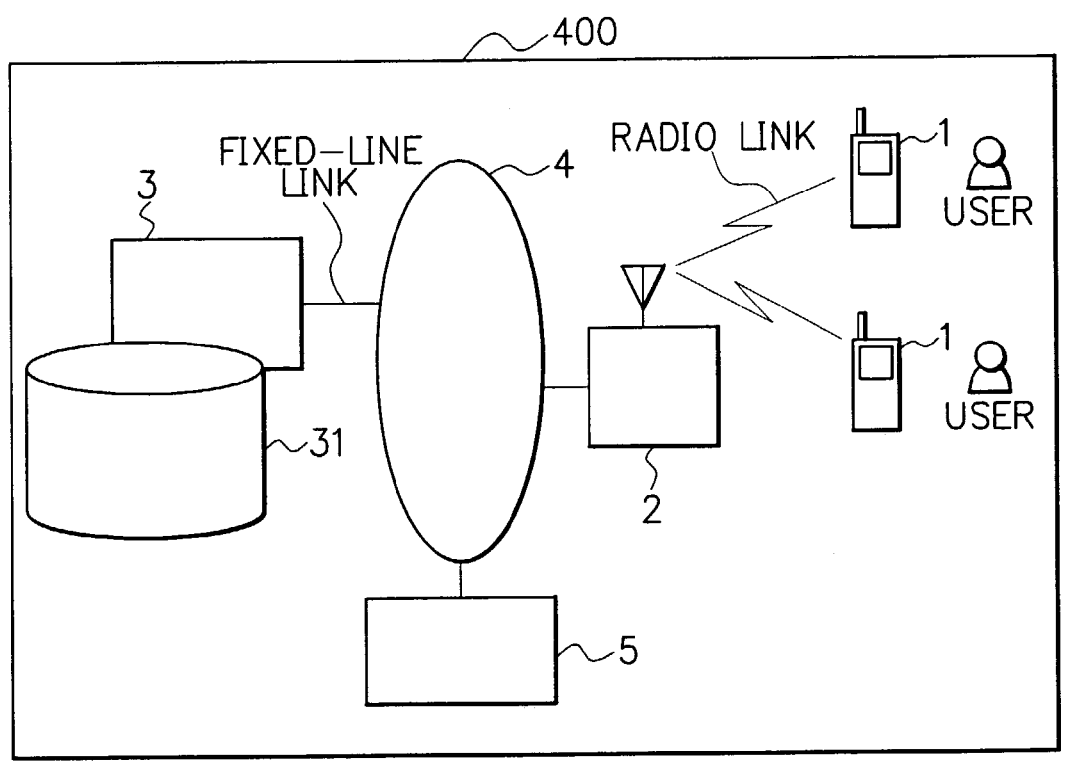
FIG. 20 is a diagram showing the entire configuration of a data transmission/reception system according to the fourth embodiment of the present invention.

FIG. 20 is a diagram showing the entire configuration of a data transmission/reception system 400 according to the fourth embodiment of the present invention. The data transmission/reception system 400 is provided with an accounting server 5 to carry out the accounting procedure in addition to the constituents of the aforementioned data transmission/reception system. The accounting server 5 is connected to the wireless communication network 4. The accounting server 5 records a log of communication processing (processing history in the computer system) concerning downloads (immediate DL/reservation DL) of contents by the mobile terminals 1. The accounting server 5 makes charges for DL service on the basis of the recorded data.

Figure 21:
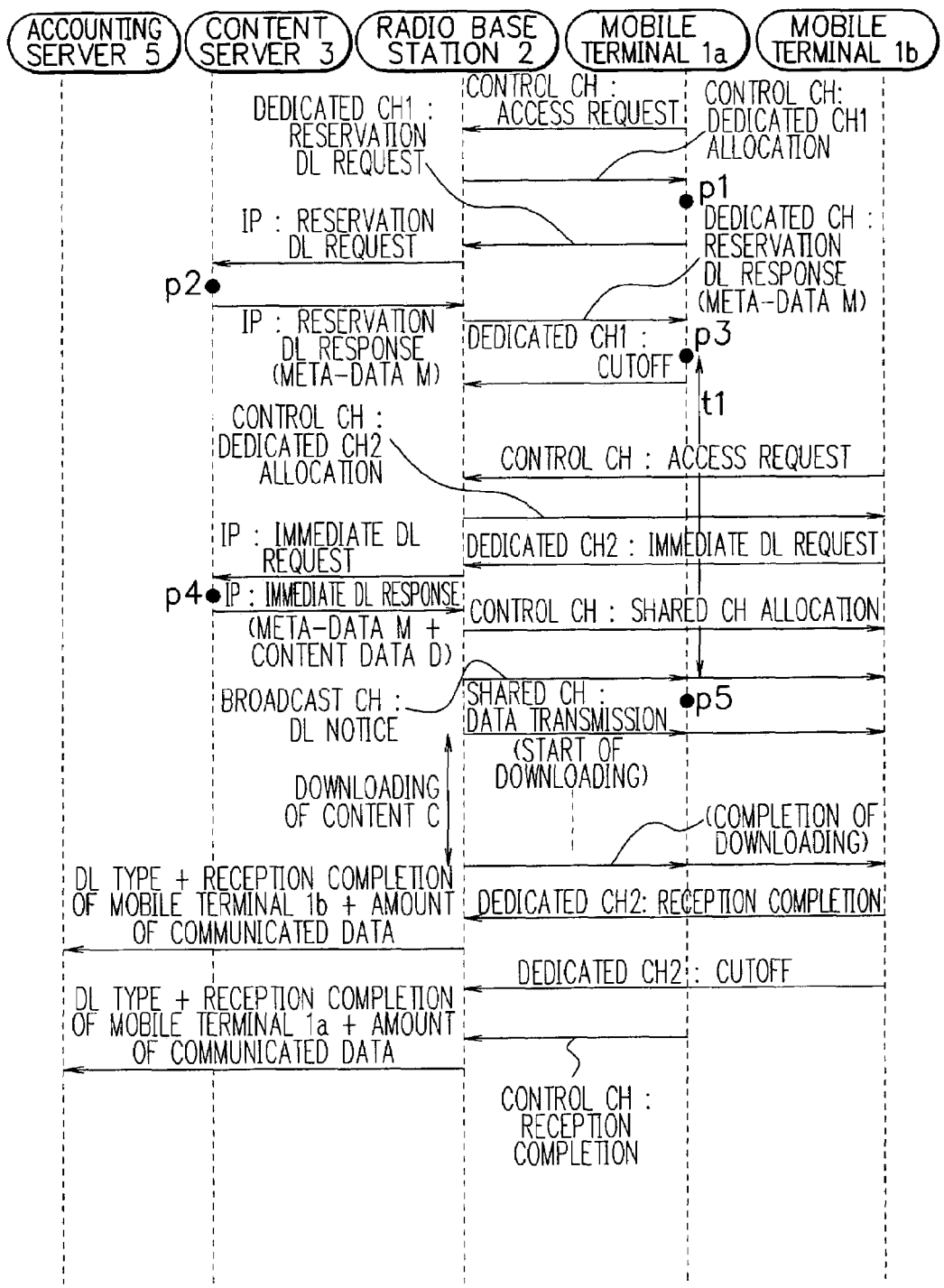
FIG. 21 is a sequence diagram showing a flow of concrete download process in the data transmission/reception system according to the fourth embodiment.

FIG. 21 is a sequence diagram showing a flow of concrete download process in the data transmission/reception system 400. The same basic processes as described previously in the first embodiment are performed for downloading of content C via the shared CH from beginning to end. After the completion of downloading via the shared CH, the mobile terminal 1b that has completed the immediate DL sends a reception completion message indicating the completion of the immediate DL of the content C to the radio base station 2 via the dedicated CH2. In the same manner, the mobile terminal 1a that has completed the reservation DL also sends a reception completion message indicating the completion of the reservation DL of the content C to the radio base station 2 via the control CH.

Having received the reception completion message from the mobile terminal 1, the radio base station 2 determines which type of download the mobile terminal 1 executes. When receiving the reception completion message via the control CH, the radio base station 2 determines that the mobile terminal 1 completes the reservation DL. Besides, the reception completion message sent from the mobile terminal 1 to the radio base station 2 may include information on the DL type executed by the mobile terminal 1 such as a code for identifying the DL type, and the radio base station 2 may determine the DL type based on the information. After that, the radio base station 2 sends DL type information (information for specifying either the immediate DL or the reservation DL) about the download executed by the mobile terminal 1 and information indicating the completion of downloading of the content C as well as the amount of downloaded data received by the mobile terminal 1 to the accounting server 5 via a prescribed channel. The radio base station 2 and wireless communication network 4 are generally provided with a function for recording the amount of data (especially, the amount of data sent via the dedicated channel) received by user terminals in communications.

When receiving the information indicating the DL type, the completion of downloading of the content C, and the amount of data received by the mobile terminal 1, the accounting server 5 records the information as data transmission/reception log information, and conducts accounting of the download based on the recorded data.

The accounting server 5 conducts the accounting of DL service on a regular basis (generally, once a month) referring to the data transmission/reception log information. A communication charge to a user is normally derived from the product of the total amount of data received by his/her mobile terminal 1 and charge per unit of data (metered rate accounting).

The reception completion message may be sent to the radio base station 2 each time the mobile terminal 1 receives a prescribed amount of downloaded data (a unit of data), for example, a certain number of data packets of the content C. In this case, the accounting server 5 compiles a reception record of each unit of data, and conducts accounting of the download based on the reception records.

Incidentally, the data transmission/reception system 400 further comprises a means for determining which DL type the user selects, the immediate DL or the reservation DL. Thereby, the accounting is executed according to the DL type selected by each user. The radio base station 2, for example, may be provided with the DL type determining means, and determines the DL type based on the reception completion message received from the mobile terminal 1. As described above, since the accounting server 5 records the DL type information about the respective downloads conducted by the mobile terminals 1 as data transmission/reception log information, the accounting server 5 can conduct the accounting on the basis of the information.

While in cellular telephone networks such as the data transmission/reception system 400 of this embodiment, communication charges are basically made at a metered rate (accounting is given depending on the amount of transmitted/received data), the data transmission/reception system 400 may adopt other methods or settings for the accounting of communication charges or content DL service charges. As an example of the accounting setting, it is possible to set the charge for the reservation DL lower than that for the immediate DL. In the case of the reservation DL, the execution of downloading of content is delayed until the immediate DL of the same content occurs so that plural mobile terminals 1 can share a downlink shared channel and simultaneously receive the content. Consequently, communication resources required for downloading the content can be saved, thus enabling the lower charges for the reservation DL.

In the above accounting setting, although the immediate DL requires a higher charge than the reservation DL, the user who executes the immediate DL can obtain content promptly and reliably. On the other hand, the user who executes the reservation DL receives content at an uncertain time, however, communication charges can be held down. Besides, in association with the data transmission/reception system 200 of the second embodiment, the efficiency of simultaneous downloading via the shared channel is increased as a user sets the waiting time T longer. That is, radio communication carriers can reduce the cost of communication resources as users set the waiting time T longer. Accordingly, charges may be reduced for the users who set the long waiting time.

In the following, a description will be given of a data transmission/reception system 500 according to the fifth embodiment of the present invention. In the data transmission/reception system 500, a DL reservation for content can be made not only by single content but also by category with the use of the meta-data of content. Basically, the data transmission/reception system 500 otherwise operates similarly to the above-mentioned data transmission/reception system. When making a DL reservation by category, a user specifies such category as a singer or a genre to obtain contents that belong to the category.

The mobile terminal 1 in the data transmission/reception system 500 further comprises a category reservation means for performing the reservation DL operation in a unit of category. As described above, the meta-data of content includes various information elements (attribute values) as attributes of content. For example, there are such attributes of music content as singer or band, songwriter, and player. On the other hand, examples of the attributes of moving image content include producer or creator, the genre of the image, and the like. Relevant attribute values (concrete singer's name or creator's name) are written in the meta-data of content. In the data transmission/reception system 500, when a user specifies a category or an attribute value for making a DL reservation through the mobile terminal 1, the mobile terminal 1 can receive all contents belonging to the specified category.

At the beginning of the reservation DL by category (category reservation DL), a user selects the category reservation DL as a DL type, and specifies a category on the mobile terminal 1. The content list L may include a list of selectable categories so that the user can select a category from the list. When the mete-data M of contents C are provided with a singer attribute, the user can select a singer's name as an attribute value of the singer attribute. The mobile terminal 1 makes a category reservation DL request to the content server 3. The category reservation DL request includes the category selected from the list as specified category information. In response to the category reservation DL request, the content server 3 returns attribute values corresponding to the specified category based on the specified category information differently from the content server 3 in the data transmission/reception system 100 which returns the meta-data M of requested content C. For example, when a certain singer is specified as a category, corresponding attribute values (the name of the singer) in the meta-data M of contents C are sent to the mobile terminal 1. The attribute values are written in a prescribed data format such as in a letter/character string or a numeric. Having received the attribute values (hereinafter referred to as attribute value information m) from the content server 3, the mobile terminal 1 registers the attribute value information m as an entry of registered reservation information Mr in the reservation meta-data managing section 16, and completes the DL reservation operation. After that, the mobile terminal 1 enters the DL notice wait state.

Figure 22:
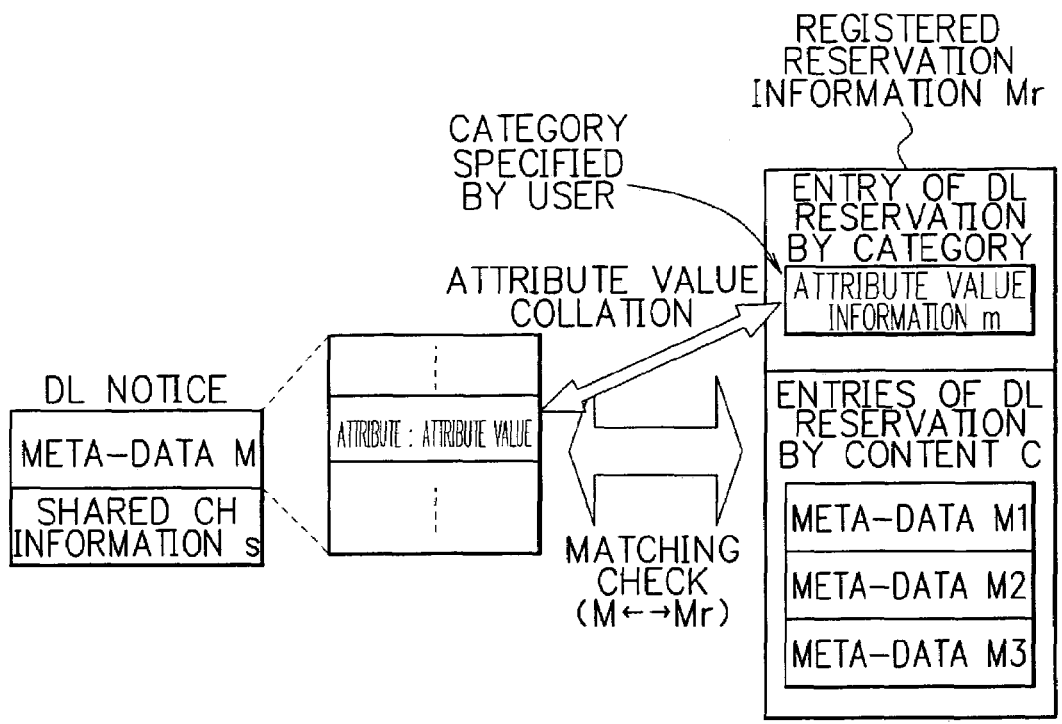
FIG. 22 is a diagram illustrating the reservation download operation in which contents are selected by category in the data transmission/reception system according to the fifth embodiment of the present invention.

FIG. 22 is a diagram for illustrating the category reservation DL in the data transmission/reception system 500. The reservation meta-data managing section 16 of the mobile terminal 1 manages the registered reservation information Mr concerning the reservation DL. In FIG. 22, the lower part of the registered reservation information Mr shows entries of DL reservations in units of contents, including three entries of meta-data M1 to M3 of reserved contents C. The upper part of the registered reservation information Mr shows an entry of the category DL reservation, in which a category specified by a user is registered as the attribute value information m.

When receiving the DL notice from the radio base station 2 via the broadcast channel, the mobile terminal 1 refers to the meta-data M in the DL notice, and checks matching between the meta-data M and attribute value information m stored in the reservation meta-data managing section 16 as the registered reservation information Mr. Namely, the attribute value information m is compared to the attribute value of the relevant attribute in the received meta-data M. When the two attribute values match, it is determined that the content C to be transmitted from the radio base station 2 in the radio link belongs to the category selected for the category reservation DL on the mobile terminal 1. After that, the mobile terminal 1 starts downloading the content C via the shred channel s. For example, when a singer is selected as a category for the category reservation DL (the attribute value information m is the name of the singer), and the attribute value of the singer attribute in the meta-data M in the DL notice is coincident with the attribute value information m as a result of the matching check, downloading of the content C is initiated.

On the occasion of specifying the category on the mobile terminal 1, the user may directly input the specified category information through the input section 104. Besides, the list of selectable contents may be configured in the content list L so that the selected content (specified category information) can be directly stored in the mobile terminal 1 as the attribute value information m. In this case, it is unnecessary to send the reservation DL request to the content server 3. Further, the user may select the attribute value from the mete-data M of the contents C which the user has already obtained.

Referring to the flowchart of FIG. 13, a description will be given of the operation of the data transmission/reception system 500 by comparison with that of the data transmission/reception systems 100. In the data transmission/reception system 500, matching is checked in a unit of category. Additionally, in the meta-data matching check at step S22, the received meta-data M is collated with the mete-data M of the contents C which have already been received on the mobile terminal 1. When the two meta-data M match, the mobile terminal 1 does not execute downloading of the content C to avoid double downloading of the same content.

In addition, when the mobile terminal 1 receives the content C that belongs to the specified category, the reservation meta-data managing section 16 does not delete the registered attribute value information m in the meta-data deleting process at step S27. In the data transmission/reception system 500, the attribute value information m is deleted on the termination of the reservation DL operation for the selected category, for example, after a lapse of the prescribed waiting time. Incidentally, the mobile terminal 1 may include a means for deleting entries of the registered reservation information Mr in the reservation meta-data managing section 16 according to the operation/instruction by the user. With this means, the user can perform such operation as releasing the DL notice wait state when he/she determines that enough contents C belonging to the selected category have been obtained.

In the data transmission/reception system 500 of the fifth embodiment, the contents targeted for the reservation DL can be specified by category. That is, in order to obtain data belonging to a category, users do not need to make a request with respect to each content included in the category, and it is possible to download plural contents in the category based on the DL notices. Such function does not complicate the operation of each section or means, and can be implemented by substantially the same processes as described previously for the preceding embodiments.

In the following, a description will be given of a data transmission/reception system 600 according to the sixth embodiment of the present invention. In the data transmission/reception system 600, copyright protection for contents downloaded to the mobile terminals 1 is carried out with the use of the meta-data in addition to the processes performed in the above-mentioned data transmission/reception system.

Figure 23:
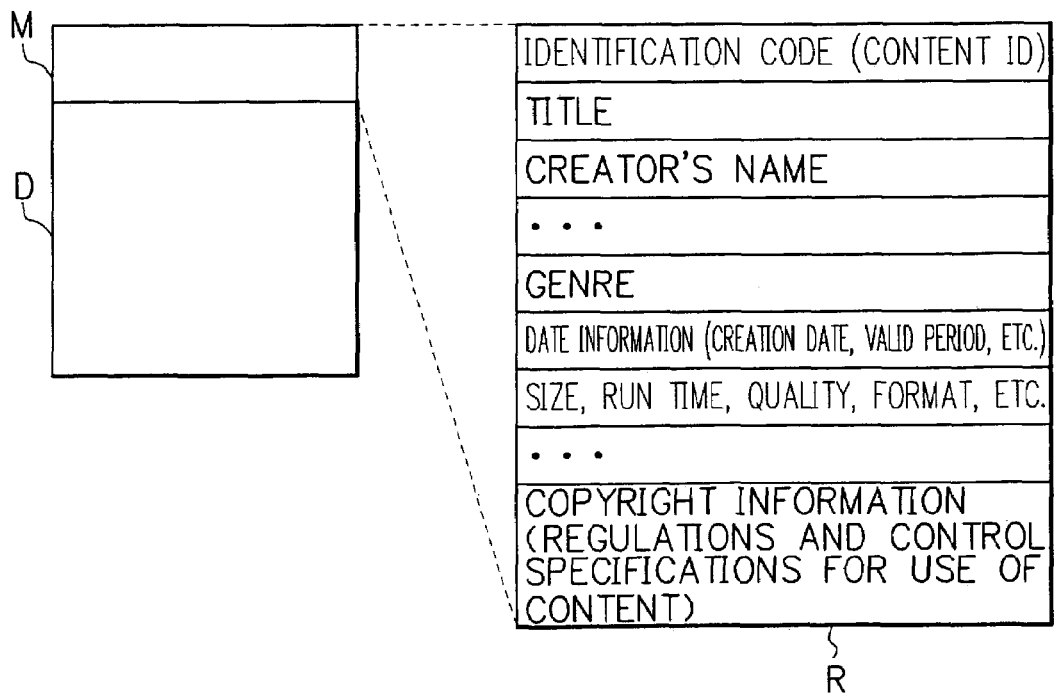
FIG. 23 is a diagram showing the logical configuration of a data record of content managed by a content managing means of the content server in the data transmission/reception system according to the sixth embodiment of the present invention.

FIG. 23 is a diagram showing the logical configuration of a data record of content managed by the content managing means 31 of the content server 3 in the data transmission/reception system 600. As can be seen in FIG. 23, the meta-data M of the content C includes copyright information R as an information element. The copyright information R corresponds to regulations and control specifications for the use of content C on the mobile terminals 1. After the completion of downloading of content C via the shared channel s, the mobile terminal 1 refers to the copyright information R in the meta-data M of the content C to regulate and control the use of the content C according to the description of the copyright information R when the mobile terminal 1 uses (stores, reproduces or copies) the content C. On this occasion, the mobile terminal 1 may perform accounting procedures.

The data transmission/reception system 600, in which copyright protection for content C is automatically carried out when the mobile terminal 1 uses the content C, can be implemented by adding the copyright information R to the meta-data M. As described above, the copyright information R corresponds to regulations and control specifications for the use (storage, reproduction or copy) of content C on the mobile terminals 1. The mobile terminals 1 are allowed to use the content C within the permissible range defined by the use regulation information, and its' use of content C is automatically controlled according to the use control information. The use regulation/control information may be described by the creator of each content C (a person or organization being responsible for the content) or content distributor (a host which offers content distribution service: the content server 3 in the data transmission/reception system of the present invention).

Incidentally, there is found an example of the technique for executing the aforementioned copyright protection, entitled "system and method for safe transaction management and electronic copyright protection" in Japanese Patent Applications laid open No. HEI10-512074.

While in the data transmission/reception system of the above-described embodiments, the mobile terminal 1 is provided with both the reservation download processing means 12 and immediate download processing means 13, the mobile terminal 1 may have either one of them. In this case, the user is given only one choice for the DL type depending on the function of his/her mobile terminal 1. However, the data transmission/reception system of the present invention as a whole serves the aforementioned characteristic functions when both mobile terminals 1 with the reservation download processing means 12 and those with the immediate download processing means 13 are present in the system.

Besides, while in the data transmission/reception system of the above-described embodiments, the mobile terminal 1 basically receives the entire data of content C from the content server 3 through the DL service, it is possible to offer streaming service as a type of download, in which content C of prescribed data quality is sent to the mobile terminal 1. In this case, the content reproducing section 15 of the mobile terminal 1 has functions for executing streaming reproduction and the like.

Furthermore, while in the above description, it is assumed that the data transmission/reception system of the present invention is applied to a W-CDMA radio communication system which includes a means for allocating the shared channel in the radio links, there is no limitation on the type of the allocated channel. For example, the bi-directional (up-link/downlink) channel, namely, the dedicated channel in W-CDMA allocated for the mobile terminal 1 which executes the immediate DL may be shared with other mobile terminals 1 in the radio communication zone of the radio base station 2. There is a description about the common use of the bi-directional channel in the aforementioned Japanese Patent Application laid open No. 2001-69558.

Furthermore, while in the data transmission/reception system of the above-described embodiments, the meta-data M of desired content C is basically stored in the reservation meta-data managing section 16 of the mobile terminal 1 for the reservation DL, the reservation meta-data managing section 16 for managing the DL reservation may be included in a node other than the mobile terminal 1. In the case where the reservation meta-data managing section 16 is provided, for example, in the content server 3, the content server 3 needs to manage DL reservations made by plural mobile terminals 1.

Furthermore, in the data transmission/reception system of the above-described embodiments, the content server 3 manages sets of the content data D and meta-data M of contents C, and the mobile terminal 1 makes a DL reservation by a request for the meta-data M of desired content C to the content server 3. However, it is not that the meta-data M of the content C have to be received from the content server 3, and the sets of the content data D and meta-data M of contents C may be managed by a node other than the content server 3. In this case, the mobile terminal 1 receives the meta-data M of the content C from the node other than the content server 3 to make a DL reservation. Alternatively, the mobile terminal 1 may originally maintain many meta-data M therein. In such case, it is unnecessary to make a reservation DL request to the content server 3, and the DL reservation is arranged only by making an entry of the mete-data M of desired content C in the reservation meta-data managing section 16. Besides, the content list L may be formed so that the meta-data M of desired content C is registered in the reservation meta-data managing section 16 only by selecting the content C from the content list L to arrange the DL reservation.

While the preferred embodiments of the present invention have been described using specific terms, such description is for illustrative purposes only, and it is to be understood that changes and variations may be made without departing from the spirit or the scope of the present invention.

As set forth hereinabove, in accordance with the present invention, plural mobile terminals that request for the same content share a channel in radio links to download the content. Accordingly, radio communication carriers can improve efficiency in the use of radio links for transmitting contents, and thus alleviating the shortage of communication resources (line or channel resources). For example, in comparison with the aforementioned prior art disclosed in Japanese Patent Application laid open No. 2002-26836, it is possible to ensure the more efficient use of radio links. With the prior art, it is required to secure regular broadcast channels all the time. On the other hand, in the data transmission/reception system of the present invention, the radio base station assigns a prescribed channel (shared channel) for the mobile terminals in timing with the transmission of content, and therefore communication resources can be used for other purposes while the channel is not assigned. Similarly, in comparison with the aforementioned prior art disclosed in Japanese Patent Application laid open No. 2001-69558, it is also possible to ensure the more efficient use of radio links. According to the prior art method, a channel is shared during a predetermined period of waiting time or only when receiving a request for content from a mobile terminal while the base station is transmitting the same content to another mobile terminal. On the other hand, in the data transmission/reception system of the present invention, two types of downloading are offered to users so that the user who wishes for the common use of a channel (the user who executes the reservation DL) waits for the user with whom the former user can share the same channel (the user who executes the immediate DL). As it is made possible to improve efficiency in the use of radio links and alleviate the shortage of communication resources, the cost of the radio links can be lowered, thus enabling a reduction of communication charges. Consequently, users can enjoy the content download service with lower communication charges.

Moreover, in accordance with the present invention, two types of download methods: immediate download and reservation download are offered to users. Therefore, it is possible to meet the needs of both users who wish to obtain content immediately and users who choose inexpensive communication charge rater than immediate downloading.

Furthermore, in accordance with the present invention, the content download service (on demand download service) is carried out based on requests from users differently from the broadcasting type service in which content is delivered to users at the fixed hour. The users can download content data from beginning to end and obtain the entire content through the service.

In accordance with an embodiment of the present invention, each user terminal is provided with a meta-data managing means for managing the DL reservation. Consequently, the content download service in the data transmission/reception system of the present invention can be realized without imposing a burden of reservation management on the content server or the like.

In accordance with another embodiment of the present invention, each user can decide and set the waiting time for the download notice wait state after making a download reservation on his/her user terminal. In addition, by setting a maximum permissible value of the waiting time in the data transmission/reception system, it is possible to balance the needs of users, content providers and radio communication carriers, thus enabling a design for proper service.

In accordance with another embodiment of the present invention, the user terminal which executes the reservation download carries out data complementary process by making a request for missing data (unreceived data packets) when downloading of content is suspended for any reason or transmitted data packets are lost in radio links. By this means, the user terminal can obtain the entire content data of the content.

In accordance with another embodiment of the present invention, the accounting server compiles communication records for downloads of contents made by user terminals. Besides, it is determined which download type each user selects, the immediate download or the reservation download, based on a reception completion message sent from the user terminal after the completion of downloading. Thus, accounting can be conducted according to the download type. For example, radio communication carriers can set the charge for the reservation download lower than that for the immediate download.

In accordance with still another embodiment of the present invention, with the use of information elements described in the meta-data of contents, it is possible to offer the category reservation download service in which contents can be downloaded in a unit of category without performing any complicated process.

In accordance with yet another embodiment of the present invention, the meta-data of content includes copyright information. After the completion of downloading of content, each mobile terminal refers to the copyright information, and regulates/controls the use of the content. Thus, it is possible to handle the process involved in copyright rules set by the creators of contents or content distributors.

While the present invention has been described with reference to the particular illustrative embodiments, it is not to be restricted by the embodiments but only by the appended claims. It is to be appreciated that those skilled in the art can change or modify the embodiment without departing from the scope and spirit of the present invention.

What is claimed is:

1. A data transmission/reception system, comprising: a radio base station;
  a plurality of mobile terminals; and
  a content server for managing contents; wherein: the mobile terminals each include an immediate download processing means for immediately downloading desired content from the content server, said content being on-demand content for delivery starting from a beginning of the content, and reservation download processing means for reserving a download of content to download the content afterwards;
  the reservation download processing means reserves a download of desired content by obtaining and storing meta-data of the content;
  the radio base station assigns a downlink shared channel to the mobile terminal which immediately downloads content by the immediate download processing means when transmitting the content thereto, and simultaneously notifies all the mobile terminals in the radio communication zone of the radio base station about information on the downlink shared channel and meta-data of the outgoing content; and
  the mobile terminals that have been notified of the information match the notified meta-data with the meta-data stored by the reservation download processing means, and tune in to the downlink shared channel to download the content when the outgoing content proves coincident with the reserved content.

2. The data transmission/reception system claimed in claim 1, wherein the mobile terminal further includes a means for operating in standby for a certain period of waiting time after reserving a download of content and, when receiving no notification from the radio base station within the waiting time, making a request to the content server for an immediate download of the content to download the reserved content.

3. The data transmission/reception system claimed in claim 2, wherein the mobile terminal further includes a means for making a request to the radio base station for missing data packets through a prescribed channel to obtain the entire data of the reserved content when the mobile terminal has not received the entire data of the reserved content by downloading.

4. The data transmission/reception system claimed in claim 2, further comprising:
  an accounting server; and
  a determining means for determining a download type adopted by the respective mobile terminals; and wherein:
  the accounting server maintains communication records with regard to downloads made by the mobile terminals, and conducts accounting for the mobile terminals according to the download type determined by the determining means.

5. The data transmission/reception system claimed in claim 2, wherein the mobile terminal further includes a category reservation means for specifying a certain, category to reserve downloads of contents by category, and selectively downloads the contents which belong to the specified category via the radio link.

6. The data transmission/reception system claimed in claim 2, wherein:
the meta-data of content includes a description of copyright information indicating regulations and control specifications for the use of the content in the mobile terminals as an information element; and
the mobile terminal regulates and controls the use of the content according to the copyright information after the completion of downloading.

7. The data transmission/reception system claimed in claim 2, wherein the mobile terminal further includes a means by which a user sets the waiting time, and operates in standby based on the waiting time set by the user.

8. The data transmission/reception system claimed in claim 7, wherein the mobile terminal further includes a means for making a request to the radio base station for missing data packets through a prescribed channel to obtain the entire data of the reserved content when the mobile terminal has not received the entire data of the reserved content by downloading.

9. The data transmission/reception system claimed in claim 7, further comprising:
an accounting server; and
a determining means for determining a download type adopted by the respective mobile terminals; and wherein:
the accounting server maintains, communication records with regard to downloads made by the mobile terminals, and conducts accounting for the mobile terminals according to the download type determined by the determining means.

10. The data transmission/reception system claimed in claim 7, wherein the mobile terminal further includes a category reservation means for specifying a certain-category to reserve downloads of contents by category, and selectively downloads the contents which belong to the specified category via the radio link.

11. The data transmission/reception system claimed in claim 7, wherein:
the meta-data of content includes a description of copyright information indicating regulations and control specifications for the use of the content in the mobile terminals as an information element; and
the mobile terminal regulates and controls the use of the content according to the copyright information after the completion of downloading.

12. The data transmission/reception system claimed in claim 1, wherein the mobile terminal further includes a means for making a request to the radio base station for missing data packets through a prescribed channel to obtain the entire data of the reserved content when the mobile terminal has not received the entire data of the reserved content by downloading.

13. The data transmission/reception system claimed in claim 12, further comprising:
an accounting server; and
a determining means for determining a download type adopted by the respective mobile terminals; and wherein:
the accounting server maintains communication records with regard to downloads made by the mobile terminals, and conducts accounting for the mobile terminals according to the download type determined by the determining means.

14. The data transmission/reception system claimed in claim 12, wherein the mobile terminal further includes a category reservation means for specifying a certain category to reserve downloads of contents by category, and selectively downloads the contents which belong to the specified category via the radio link.

15. The data transmission/reception system claimed in claim 12, wherein:
the meta-data of content includes a description of copyright information indicating regulations and control specifications for the use of the content in the mobile terminals as an information element; and
the mobile terminal regulates and controls the use of the content according to the copyright information after the completion of downloading.

16. The data transmission/reception system claimed in claim 1, further comprising:
an accounting server; and
a determining means for determining a download type adopted by the respective mobile terminals; and wherein:
the accounting server maintains communication records with regard to downloads made by the mobile terminals, and conducts accounting for the mobile terminals according to the download type determined by the determining means.

17. The data transmission/reception system claimed in claim 16, wherein:
the mobile terminal sends a reception completion message to the radio base station on completion of downloading;
the radio base station determines a download type adopted by the mobile terminal based on the reception completion message, and sends information including the determined download type, the reception completion message and the amount of communicated data to the accounting server; and
the accounting server stores the information sent from the radio base station as the communication records to conduct accounting according to the communication records.

18. The data transmission/reception system claimed in claim 17, wherein the mobile terminal further includes a category reservation means for specifying a certain category to reserve downloads of contents by category, and selectively downloads the contents which belong to the specified category via the radio link.

19. The data transmission/reception system claimed in claim 17, wherein:
the meta-data of content includes a description of copyright information indicating regulations and control specifications for the use of the content in the mobile terminals as an information element; and
the mobile terminal regulates and controls the use of the content according to the copyright information after the completion of downloading.

20. The data transmission/reception system claimed in claim 16, wherein the mobile terminal further includes a category reservation means for specifying a certain category to reserve downloads of contents by category, and selectively downloads the contents which belong to the specified category via the radio link.

21. The data transmission/reception system claimed in claim 16, wherein:
the meta-data of content includes a description of copyright information indicating regulations and control specifications for the use of the content in the mobile terminals as an information element; and
the mobile terminal regulates and controls the use of the content according to the copyright information after the completion of downloading.

22. The data transmission/reception system claimed in claim 1, wherein the mobile terminal further includes a category reservation means for specifying a certain category to reserve downloads of contents by category, and selectively downloads the contents which belong to the specified category via the radio link.

23. The data transmission/reception system claimed in claim 22, wherein:
the meta-data of content includes a variety of attribute values as information elements;
the category reservation means specifies the attribute value and stores it to reserve downloads of contents by category; and
the mobile terminal that has received notification from the radio base station matches the meta-data in the notification with the stored attribute value to download the content via the downlink shared channel when the two values match.

24. The data transmission/reception system claimed in claim 23, wherein:
the meta-data of content includes a description of copyright information indicating regulations and control specifications for the use of the content in the mobile terminals as an information element; and
the mobile terminal regulates and controls the use of the content according to the copyright information after the completion of downloading.

25. The data transmission/reception system claimed in claim 22, wherein:
the meta-data of content includes a description of copyright information indicating regulations and control specifications for the use of the content in the mobile terminals as an information element; and
the mobile terminal regulates and controls the use of the content according to the copyright information after the completion of downloading.

26. The data transmission/reception system claimed in claim 1, wherein:
the meta-data of content includes a description of copyright information indicating regulations and control specifications for the use of the content in the mobile terminals as an information element; and
the mobile terminal regulates and controls the use of the content according to the copyright information after the completion of downloading.

27. A data transmission/reception system, comprising: a radio base station;
a plurality of mobile terminals; and a content server for managing contents and meta-data thereof to offer download service to the mobile terminals; wherein:
the mobile terminals each include a data communication section provided with an immediate download processing means for immediately downloading desired content from the content server, said content being on-demand content for delivery starting from a beginning of the content, and a reservation download processing means for reserving a download of desired content by obtaining and storing meta-data of the content to download the content afterwards;
when receiving a request for an immediate download from one of the mobile terminals, the content server sends content data and meta-data of the requested content to the mobile terminal in response;
when receiving a request for a reservation download of content from one of the mobile terminals, the content server sends meta-data of the requested content to the mobile terminal in response;
the radio base station assigns a downlink shared channel to the mobile terminal when transmitting the content data and meta-data of the requested content sent from the content server by the immediate download request, and simultaneously notifies all the mobile terminals in the radio communication zone of the radio base station about information on the downlink shared channel and meta-data of the outgoing content; and
the mobile terminals that have been notified of the information match the notified meta-data with the meta-data stored by the reservation download processing means, and tune in to the downlink shared channel to download the content when the outgoing content proves coincident with the reserved content.

28. The data transmission/reception system claimed in claim 27, wherein the mobile terminal further includes a means for operating in standby for a certain period of waiting time after reserving a download of content and, when receiving no notification from the radio base station within the waiting time, making a request to the content server for an immediate download of the content to download the reserved content.

29. The data transmission/reception system claimed in claim 28, wherein the mobile terminal further includes a means by which a user sets the waiting time, and operates in standby based on the waiting time set by the user.

30. The data transmission/reception system claimed in claim 29, wherein the mobile terminal further includes a means for making a request to the radio base station for missing data packets through a prescribed channel to obtain the entire data of the reserved content when the mobile terminal has not received the entire data of the reserved content by downloading.

31. The data transmission/reception system claimed in claim 28, wherein the mobile terminal further includes a means for making a request to the radio base station for missing data packets through a prescribed channel to obtain the entire data of the reserved content when the mobile terminal has not received the entire data of the reserved content by downloading.

32. The data transmission/reception system claimed in claim 28, further comprising:
an accounting server; and
a determining means for determining a download type adopted by the respective mobile terminals; and wherein:
the accounting server maintains communication records with regard to downloads made by the mobile terminals, and conducts accounting for the mobile terminals according to the download type determined by the determining means.

33. The data transmission/reception system claimed in claim 28, wherein the mobile terminal further includes a category reservation means for specifying a certain category to reserve downloads of contents by category, and selectively downloads the contents which belong to the specified category via the radio link.

34. The data transmission/reception system claimed in claim 28, wherein:
the meta-data of content includes a description of copyright information indicating regulations and control specifications for the use of the content in the mobile terminals as an information element; and
the mobile terminal regulates and controls the use of the content according to the copyright information after the completion of downloading.

35. The data transmission/reception system claimed in claim 27, wherein the mobile terminal further includes a means for making a request to the radio base station for missing data packets through a prescribed channel to obtain the entire data of the reserved content when the mobile terminal has not received the entire data of the reserved content by downloading.

36. The data transmission/reception system claimed in claim 35, further comprising:
an accounting server; and
a determining means for determining a download type adopted by the respective mobile terminals; and wherein:
the accounting server maintains communication records with regard to downloads made by the mobile terminals, and conducts accounting for the mobile terminals according to the download type determined by the determining means.

37. The data transmission/reception system claimed in claim 35, wherein the mobile terminal further includes a category reservation means for specifying a certain category to reserve downloads of contents by category, and selectively downloads the contents which belong to the specified category via the radio link.

38. The data transmission/reception system claimed in claim 35, wherein:
the meta-data of content includes a description of copyright information indicating regulations and control specifications for the use of the content in the mobile terminals as an information element; and
the mobile terminal regulates and controls the use of the content according to the copyright information after the completion of downloading.

39. The data transmission/reception system claimed in claim 27, further comprising:
an accounting server; and
a determining means for determining a download type adopted by the respective mobile terminals; and wherein:
the accounting server maintains communication records with regard to downloads made by the mobile terminals, and conducts accounting for the mobile terminals according to the download type determined by the determining means.

40. The data transmission/reception system claimed in claim 39, wherein:
the mobile terminal sends a reception completion message to the radio base station on completion of downloading;
the radio base station determines a download type adopted by the mobile terminal based on the reception completion message, and sends information including the determined download type, the reception completion message and the amount of communicated data to the accounting server; and
the accounting server stores the information sent from the radio base station as the communication records to conduct accounting according to the communication records.

41. The data transmission/reception system claimed in claim 39, wherein the mobile terminal further includes a category reservation means for specifying a certain category to reserve downloads of contents by category, and selectively downloads the contents which belong to the specified category via the radio link.

42. The data transmission/reception system claimed in claim 39, wherein:
the meta-data of content includes a description of copyright information indicating regulations and control specifications for the use of the content in the mobile terminals as an information element; and
the mobile terminal regulates and controls the use of the content according to the copyright information after the completion of downloading.

43. The data transmission/reception system claimed in claim 27, wherein the mobile terminal further includes a category reservation means for specifying a certain category to reserve downloads of contents by category, and selectively downloads the contents which belong to the specified category via the radio link.

44. The data transmission/reception system claimed in claim 43, wherein:
the meta-data of content includes a variety of attribute values as information elements;
the category reservation means specifies the attribute value and stores it to reserve downloads of contents by category; and
the mobile terminal that has received notification from the radio base station matches the meta-data in the notification with the stored attribute value to download the content via the downlink shared channel when the two values match.

45. The data transmission/reception system claimed in claim 43, wherein:
the meta-data of content includes a description of copyright information indicating regulations and control specifications for the use of the content in the mobile terminals as an information element; and
the mobile terminal regulates and controls the use of the content according to the copyright information after the completion of downloading.

46. The data transmission/reception system claimed in claim 27, wherein:
the meta-data of content includes a description of copyright information indicating regulations and control specifications for the use of the content in the mobile terminals as an information element; and
the mobile terminal regulates and controls the use of the content according to the copyright information after the completion of downloading.

47. A mobile terminal which is linked to a radio base station via a radio link and downloads content by communicating with a content server, comprising:
a radio communication section for having radio communication with the radio base station via the radio link;
a data communication section for communicating data with the content server through the radio communication section; and
a content storage/reproduction section for storing/reproducing content downloaded from the content server; wherein:
the data communication section is provided with an immediate download processing means for immediately downloading content, said content being on-demand content for delivery starting from a beginning of the content, and a reservation download processing means for reserving a download of content to download the content afterwards; and
when receiving notification including information on a downlink shared channel for transmitting content from the base station, the data communication section tunes in to the downlink shared channel and selectively downloads the reserved content, and wherein:

the reservation download processing means reserves a download of desired content by storing meta-data of the content in the mobile terminal;

when receiving notification including information on the meta-data of outgoing content in the radio link and the downlink shared channel for transmitting the content, the data communication section matches the meta-data in the notification with the meta-data stored by the reservation download processing means, and tunes in to the downlink shared channel to download the content when two meta-data match.

48. The mobile terminal claimed in claim 47, wherein the mobile terminal further comprises a means for operating in standby for a certain period of waiting time after reserving a download of content and, when receiving no notification from the radio base station within the waiting time, making request to the server for an immediate download of the content to download the reserved content.

49. The mobile terminal claimed in claim 48, wherein the mobile terminal further comprises a means for sending a request for missing data packets to the radio base station via a prescribed channel to obtain the entire data of the reserved content when the mobile terminal has not received the entire data of the reserved content through downloading performed by the reservation download processing means.

50. The mobile terminal claimed in claim 48, wherein:
the meta-data of content includes a variety of attribute values as information elements;
the mobile terminal further comprises a means for specifying the attribute value and stores it to reserve downloads of contents by category and, when receiving the notification from the radio base station, matches the meta-data in the notification with the stored attribute value to download the content via the downlink shared channel when the two values match.

51. The mobile terminal claimed in claim 48, wherein:
the meta-data of content includes a description of copyright information indicating regulations and control specifications for the use of the content; and
the mobile terminal further comprises a means for regulating and controlling the use or the content according to the copyright information after the completion of downloading.

52. The mobile terminal claimed, in claim 47, wherein the mobile terminal further comprises a means for operating in standby for a certain period of waiting time after reserving a download of content and, when receiving no notification from the radio base station within the waiting time, making a request to the content server for an immediate download of the content to download the reserved content.

53. The mobile terminal claimed in claim 52, wherein the mobile terminal further comprised a means by which a user sets the waiting time, and operates in standby based on the waiting time set by the user.

54. The mobile terminal claimed in claim 48, wherein the mobile terminal further comprises a means by which a user sets the waiting time, and operates in standby based on the waiting time set by the user.

55. The mobile terminal claimed in claim 54, wherein the mobile terminal further comprises a means for sending a request for missing data packets to the radio base station via a prescribed channel to obtain the entire data of the reserved content when the mobile terminal has not received the entire data of the reserved content through downloading performed by the reservation download processing means.

56. The mobile terminal claimed in claim 54, wherein:
the meta-data of content includes a variety of attribute values as information elements;
the mobile terminal further comprises a means for specifying the attribute value and stores it to reserve downloads of contents by category and, when receiving the notification from the radio base station, matches the meta-data in the notification with the stored attribute value to download the content via the downlink shared channel when the two values match.

57. The mobile terminal claimed in claim 54, wherein:
the meta-data of content includes a description of copyright information indicating regulations and control specifications for the use of the content; and
the mobile terminal further comprises a means for regulating and controlling the use of the content according to the copyright information after the completion of downloading.

58. The mobile terminal claimed in claim 47, wherein the mobile terminal further comprises a means for sending a request for missing data packets to the radio base station via a prescribed channel to obtain the entire data of the reserved content when the mobile terminal has not received the entire data of the reserved content through downloading performed by the reservation download processing means.

59. The mobile terminal claimed in claim 58, wherein;
the meta-data of content includes a variety of attribute values as information elements;
the mobile terminal further comprises a means for specifying the attribute value and stores it to reserve downloads of contents by category and, when receiving the notification from the radio base station, matches the meta-data in the notification with the stored attribute value to download the content via the downlink shared channel when the two values match.

60. The mobile terminal claimed in claim 58, wherein:
the meta-data of content includes a description of copyright information indicating regulations and control specifications for the use of the content; and
the mobile terminal further comprises a means tom regulating and controlling the use of the content according to the copyright information after the completion of downloading.

61. The mobile terminal claimed in claim 47, wherein the mobile terminal further comprises a means for sending a request for missing data packets to the radio base station via a prescribed channel to obtain the entire data of the reserved content when the mobile terminal has not received, the entire data of the reserved content through downloading performed by the reservation download process means.

62. The mobile terminal claimed in claim 47, wherein:
the meta-data of content includes a variety of attribute values as information elements;
the mobile terminal further comprises a means for specifying the attribute value and stores it to reserve downloads of contents by category and, when receiving the notification from the radio base station, matches the meta-data in the notification with the stored attribute value to download the content via the downlink shared channel when the two values match.

63. The mobile terminal claimed in claim 62, wherein:
the meta-data of content includes a description of copyright information indicating regulations and control specifications for the use of the content; and the mobile terminal further comprises a means for regulating and controlling the use of the content according to the copyright information after the completion of downloading.

64. The mobile terminal claimed in claim 47, wherein:
the meta-data of content includes a variety of attribute values as information elements;
the mobile terminal further comprises a means for specifying the attribute value and stores it to reserve downloads of contents by category and, when receiving the notification from the radio base station, matches the meta-data in the notification with the stored attribute value to download the content via the downlink shared channel when the two values match.

65. The mobile terminal claimed in claim 47, wherein:
the meta-data of content includes a description of copyright information indicating regulations and control specifications for the use of the content; and
the mobile terminal further comprises a means for regulating and controlling the use of the content according to the copyright information after the completion of downloading.

66. The mobile terminal claimed in claim 47, wherein:
the meta-data of content includes a description of copyright information indicating regulations and control specifications for the use of the content; and
the mobile terminal further comprises a means for regulating and controlling the use of the content according to the copyright information after the completion of downloading.

67. A content server comprising:
a content managing means for managing content data and meta-data; and
a data communication section for handling data communication with mobile terminals that are linked to a radio base station on a wireless communication network via radio links; wherein:
when receiving a request for a reservation download of content from the mobile terminal, the content server sends meta-data of the requested content to the mobile terminal in response;
when receiving a request for an immediate download of content from the mobile terminal, the content server sends content data and meta-data of the requested content to the mobile terminals in response, said content being on-demand content for delivery starting from a beginning of the content;
when contents are downloaded to a terminal that has requested an immediate download, a channel is shared between the immediate download terminal and a terminal that has requested a reservation download, and the contents are simultaneously downloaded to the reservation download terminal.

68. A radio base station comprising:
a radio communication section for handling radio communication with mobile terminals that are linked to the radio base station via radio links according to a prescribed multiple accessing method;
a means for assigning a prescribed channel in the radio link to send content on beginning to receive content data and meta-data from a content server; and
a means for notifying the mobile terminals in the radio communication zone of the radio base station about information on the channel; wherein:
simultaneous downloading is performed by simultaneously sending the content to the mobile terminals in the radio communication zone via the assigned channel after sending the notification; and
when contents are downloaded to a terminal that has requested an immediate download, a channel is shared between the immediate download terminal and a terminal that has requested a reservation download, and the contents are simultaneously downloaded to the reservation download terminal, said content being on-demand content for delivery starting from a beginning at the content.

69. A radio base station comprising:
a radio communication section for handling radio communication with mobile terminals that are linked to the radio base station via radio links according to a prescribed multiple accessing method;
a means for assigning a downlink shared channel to send content on beginning to receive content data and meta-data sent from a content server in response to a request to the content server for an immediate download; and
a means for simultaneously sending notification including the downlink shared channel information and the meta-data of outgoing content to the mobile terminals in the radio communication zone of the radio base station via a broadcast channel; wherein:
simultaneous downloading is performed by simultaneously sending the content to the mobile terminals in the radio communication zone via the downlink shared channel after sending the notification; and
when contents are downloaded to a terminal that has requested an immediate download, a channel is shared between the immediate download terminal and a terminal that has requested a reservation download, and the contents are simultaneously downloaded to the reservation download terminal, said content being on-demand content for delivery starting from a beginning of the content.

70. The radio base station claimed in claim 69, further comprising a means for, when receiving a request from the mobile terminal for missing data packets of content in the transmission of the content via the downlink shared channel, sending the missing data packets so that the mobile terminal can obtain the entire data of the content.

71. The radio base station claimed in claim 70, further comprising:
a means for receiving a reception completion message indicating that the reception of the content data has been completed from the mobile terminal, and determining a download type adopted by the mobile terminal based on the reception completion message; and
a means for sending information including the determined download type, the reception completion message and the amount of communicated data to an accounting server so that the accounting server can store the information.

72. The radio base station claimed in claim 69, further comprising:
a means for receiving a reception completion message indicating that the reception of the content data has been completed from the mobile terminal, and determining a download type adopted by the mobile terminal based on the reception completion message; and
a means for sending information including the determined download type, the reception completion message and the amount of communicated data to an accounting server so that the accounting server can store the information.

73. A data transmission/reception method for downloading contents from a content server to a plurality of mobile terminals linked to a radio base station via radio links, comprising:

a step in which the first mobile terminal reserves a download of desired content by obtaining and storing meta-data of the content and enters standby mode;

a step in which the content server sends content data and meta-data of content to the second mobile terminal in response to a request from the second mobile terminal;

a step in which the radio base station receives the content data and meta-data of the content from the content server, and assigns a downlink shared channel in the radio link;

a step in which the radio base station sends notification including information on the downlink shared channel and meta-data of the received content to all the mobile terminals in the radio communication zone of the radio base station;

a step in which the first mobile terminal that have received the notification matches the meta-data in the notification with the meta-data stored on the occasion of reserving the download;

a step in which the first mobile terminal tunes in to the informed downlink shared channel when the outgoing content proves coincident with the reserved content;

a step in which the radio base station starts transmitting the content via the downlink shared channel; and a step in which the first and second mobile terminals receive the content via the downlink shared channel, wherein the first mobile terminal operates in standby for a certain period of waiting time after reserving the download of the content and, when receiving no notification from the radio base station within the waiting time, makes a request to the content server for an immediate download of the content to download the reserved content.

74. The data transmission/reception method claimed in claim 73, wherein the first mobile terminal sends a request for missing data packets to the radio base station through a prescribed channel to obtain the entire data of the content when the mobile terminal has not received the entire data of the content by downloading via the downlink shared channel.

75. The data transmission/reception method claimed in claim 74, further comprising:

a step in which each of the first and second mobile terminals send a reception completion message indicating that the reception of the content data has been completed to the radio base station;

a step in which the radio base station determines a download type adopted by each mobile terminal based on the reception completion message;

a step in which the radio base station sends information including the determined download type, the reception completion message and the amount of communicated data to an accounting server;

a step in which the accounting server stores the information sent from the radio base station as the communication records; and a step in which the accounting server conducts accounting for mobile terminals according to the download type with reference to the communication records.

76. The data transmission/reception method claimed in claim 74, further comprising:

a step in which the third mobile terminal specifies an attribute value in the meta-data and stores it to reserve downloads of contents by category; and a step in which, when receiving the notification from the radio base station, the third mobile terminal matches the meta-data in the notification with the stored attribute value, and downloads the content via the downlink shared channel when the two values match.

77. The data transmission/reception method claimed in claim 74, further comprising a step in which the mobile terminal regulates and controls the use of the content based on a description of copyright information indicating regulations and control specifications for the use of the content included in the meta-data of the content after the completion of downloading.

78. The data transmission/reception method claimed in claim 73, wherein the first mobile terminal sends a request for missing data packets to the radio base station through a prescribed channel to obtain the entire data of the content when the mobile terminal has not received the entire data of the content by downloading via the downlink shared channel.

79. The data transmission/reception method claimed in claim 73, further comprising:

a step in which each of the first and second mobile terminals send a reception completion message indicating that the reception of the content data has been completed to the radio base station;

a step in which the radio base station determines a download type adopted by each mobile terminal based on the reception completion message;

a step in which the radio base station sends information including the determined download type, the reception completion message and the amount of communicated data to an accounting server;

a step in which the accounting server stores the information sent from the radio base station as the communication records; and a step in which the accounting server conducts accounting for mobile terminals according to the download type with reference to the communication records.

80. The data transmission/reception method claimed in claim 79, further comprising:

a step in which the third mobile terminal specifies an attribute value in the meta-data and stores it to reserve downloads of contents by category; and a step in which, when receiving the notification from the radio base station, the third mobile terminal matches the meta-data in the notification with the stored attribute value, and downloads the content via the downlink shared channel when the two values match.

81. The data transmission/reception method claimed in claim 79, further comprising a step in which the mobile terminal regulates and controls the use of the content based on a description of copyright information indicating regulations and control specifications for the use of the content included in the meta-data of the content after the completion of downloading.

82. The data transmission/reception method claimed in claim 73, further comprising:

a step in which each of the first and second mobile terminals send a reception completion message indicating that the reception the content data has been completed to the radio base station;

a step in which the radio base station determines a download type adopted by each mobile terminal based on the reception completion message;

a step in which the radio base station sends information including the determined download type, the reception completion message and the amount of communicated data to an accounting server;

a step in which the accounting server stores the information sent from the radio base station as the communication records; and a step in which the accounting server conducts accounting for mobile terminals according to the download type with reference to the communication records.

83. The data transmission/reception method claimed in claim 73, further comprising:
   a step in which the third mobile terminal specifies an attribute value in the meta-data and stores it to reserve downloads of contents by category; and
   a step in which, when receiving the notification from the radio base station, the third mobile terminal matches the meta-data in the notification with the stored attribute value, and downloads the content via the downlink shared channel when the two values match.

84. The data transmission/reception method claimed in claim 83, further comprising a step in which the mobile terminal regulates and controls the use of the content based on a description of copyright information indicating regulations and control specifications for the use of the content included in the meta-data of the content after the completion of downloading.

85. The data transmission/reception method claimed in claim 73, further comprising:
   a step in which the third mobile terminal specifies an attribute value in the meta-data and stores it to reserve downloads of contents by category; and
   a step in which, when receiving the notification from the radio base station, the third mobile terminal matches the meta-data in the notification with the stored attribute value, and downloads the content via the downlink shared channel when the two values match.

86. The data transmission/reception method claimed in claim 73, further comprising a step in which the mobile terminal regulates and controls the use of the content based on a description of copyright information indicating regulations and control specifications for the use of the content included in the meta-data of the content after the completion of downloading.

87. The data transmission/reception method claimed in claim 73, further comprising a step in which the mobile terminal regulates and controls the use of the content based on a description of copyright information indicating regulations and control specifications for the use of the content included in the meta-data of the content after the completion of downloading.

88. A data transmission/reception method for downloading contents from a content server to a plurality of mobile terminals linked to a radio base station via radio links, comprising:
   a step in which the first mobile terminal reserves a download by making a request to the content server for a reservation download of desired content to obtain and store meta-data of the content, and enters standby mode;
   a step in which the content server receives a request for an immediate download of content from the second mobile terminal, and sends content data and met-data of the content to the second mobile terminal in response;
   a step in which the radio base station receives the content data and meta-data of the content sent from the content server in response to the immediate download request, and assigns a downlink shared channel for the second mobile terminal;
   a step in which the radio base station simultaneously sends notification including information on the downlink shared channel and meta-data of the received content to all the mobile terminals in the radio communication zone of the radio base station via a broadcast channel;
   a step in which the first mobile terminal that have received the notification matches the meta-data in the notification with the meta-data stored on the occasion of reserving the download;
   a step in which the first mobile terminal tunes in to the informed downlink shared channel when two meta-data match; a step in which the radio base station starts transmitting the content data and meta-data via the downlink shared channel; and
   a step in which the first and second mobile terminals receive the content data via the downlink shared channel,
   wherein the first mobile terminal operates in standby for a certain period of waiting time after reserving the download of the content and, when receiving no notification from the radio base station within the waiting time, makes a request to the content server for an immediate download of the content to download the reserved content.

89. The data transmission/reception method claimed in claim 88, wherein the first mobile terminal sends a request for missing data packets to the radio base station through a prescribed channel to obtain the entire data of the content when the mobile terminal has not received the entire data of the content by downloading via the downlink shared channel.

90. The data transmission/reception method claimed in claim 89, further comprising:
   a step in which each of the first and second mobile terminals send a reception completion message indicating that the reception of the content data has been completed to the radio base station;
   a step in which the radio base station determines a download type adopted by each mobile terminal based on the reception completion message;
   a step in which the radio base station sends information including the determined download type, the reception completion message and the amount of communicated data to an accounting server;
   a step in which the accounting server stores the information sent from the radio base station as the communication records; and
   a step in which the accounting server conducts accounting for mobile terminals according to the download type with reference to the communication records.

91. The data transmission/reception method claimed in claim 89, further comprising:
   a step in which the third mobile terminal specifies an attribute value in the meta-data and stores it to reserve downloads of contents by category; and
   a step in which, when receiving the notification from the radio base station, the third mobile terminal matches the meta-data in the notification with the stored attribute value, and downloads the content via the downlink shared channel when the two values match.

92. The data transmission/reception method claimed in claim 89, further comprising a step in which the mobile terminal regulates and controls the use of the content based on a description of copyright information indicating regulations and control specifications for the use of the content included in the meta-data of the content after the completion of downloading.

93. The data transmission/reception method claimed in claim 88, wherein the first mobile terminal sends a request for missing data packets to the radio base station through a prescribed channel to obtain the entire data of the content when the mobile terminal has not received the entire data of the content by downloading via the downlink shared channel.

94. The data transmission/reception method claimed in claim 88, further comprising:
- a step in which each of the first and second mobile terminals send a reception completion message indicating that the reception of the content data has been completed to the radio base station;
- a step in which the radio base station determines a download type adopted by each mobile terminal based on the reception completion message;
- a step in which the radio base station sends information including the determined download type, the reception completion message and the amount of communicated data to an accounting server;
- a step in which the accounting server stores the information sent from the radio base station as the communication records; and
- a step in which the accounting server conducts accounting for mobile terminals according to the download type with reference to the communication records.

95. The data transmission/reception method claimed in claim 94, further comprising:
- a step in which the third mobile terminal specifies an attribute value in the meta-data and stores it to reserve downloads of contents by category; and
- a step in which, when receiving the notification from the radio base station, the third mobile terminal matches the meta-data in the notification with the stored attribute value, and downloads the content via the downlink shared channel when the two values match.

96. The data transmission/reception method claimed in claim 94, further comprising a step in which the mobile terminal regulates and controls the use of the content based on a description of copyright information indicating regulations and control specifications for the use of the content included in the meta-data of the content after the completion of downloading.

97. The data transmission/reception method claimed in claim 88, further comprising:
- a step in which each of the first and second mobile terminals send a reception completion message indicating that the reception of the content data has been completed to the radio base station;
- a step in which the radio base station determines a download type adopted by each mobile terminal based on the reception completion message;
- a step in which the radio base station sends information including the determined download type, the reception completion message and the amount of communicated data to an accounting server;
- a step in which the accounting server stores the information sent from the radio base station as the communication records; and
- a step in which the accounting server conducts accounting for mobile terminals according to the download type with reference to the communication records.

98. The data transmission/reception method claimed in claim 88, further comprising:
- a step in which the third mobile terminal specifies an attribute value in the mete data and stores it to reserve downloads of contents by category; and
- a step in which, when receiving the notification from the radio base station, the third mobile terminal matches the meta-data in the notification with the stand attribute value, and downloads the content via the downlink shared channel when the two values match.

99. The data transmission/reception method claimed in claim 98, further comprising a step in which the mobile terminal regulates and controls the use of the content based on a description of copyright information indicating regulations and control specifications for the use of the content included in the meta-data of the content after the completion of downloading.

100. The data transmission/reception method claimed in claim 88, further comprising:
- a step in which the third mobile terminal specifies an attribute value in the meta-data and stores it to reserve downloads of contents by category; and
- a step in which, when receiving the notification from the radio base station, the third mobile terminal matches the meta-data in the notification with the stored attribute value, and downloads the content via the downlink shared channel when the two values match.

101. The data transmission/reception method claimed in claim 88, further comprising a step in which the mobile terminal regulates and control the use of the content based on a description of copyright information indicating regulations and control specifications for the use of the content included in the meta-data of the content after the completion of downloading.

102. The data transmission/reception method claimed in claim 88, further comprising a step in which the mobile terminal regulates and controls the use of the content based on a description of copyright information indicating regulations and control specifications for the use of the content include in the meta-data of the content after the completion of downloading.

\* \* \* \* \*